United States Patent [19]
Inoshita et al.

[11] Patent Number: 5,954,854
[45] Date of Patent: Sep. 21, 1999

[54] METHOD FOR RECOVERING ETCHANT FROM ETCHING WASTE LIQUID CONTAINING IRON CHLORIDE

[75] Inventors: Tsutomu Inoshita; Tadao Kitazawa; Hiroyuki Matsumoto; Masaki Nagashima; Hiroshi Yoshino; Yonejiro Nagaoka; Katsumasa Mito, all of Kitakyushu, Japan

[73] Assignee: Astec Irie Co., Ltd., Fukuoka, Japan

[21] Appl. No.: 08/883,630

[22] Filed: Jun. 26, 1997

[30] Foreign Application Priority Data

| | | | |
|---|---|---|---|
| Jun. 28, 1996 | [JP] | Japan | 8-188506 |
| Jun. 28, 1996 | [JP] | Japan | 8-188508 |
| Jul. 3, 1996 | [JP] | Japan | 8-194005 |
| Sep. 13, 1996 | [JP] | Japan | 8-265378 |

[51] Int. Cl.$^6$ ....................................................... C22B 3/46
[52] U.S. Cl. ............................ 75/10.12; 75/724; 75/725; 75/726; 75/738; 205/745; 205/754; 210/715; 210/719; 210/912
[58] Field of Search ................................ 75/724, 10.12, 75/725, 726, 738; 205/745, 754; 210/715, 719, 912

[56] References Cited

U.S. PATENT DOCUMENTS

| | | | |
|---|---|---|---|
| 4,591,489 | 5/1986 | Gremm | 75/724 |
| 5,133,873 | 7/1992 | Catlin et al. | 75/726 |

*Primary Examiner*—Melvyn Andrews
*Attorney, Agent, or Firm*—Armstrong, Westerman, Hattori, McLeland & Naughton

[57] ABSTRACT

Method for recovering etchant from etching waste liquid 11 containing iron chloride is disclosed, wherein iron powder is mixed with iron chloride waste solution containing metal ions having a lesser ionization tendency than iron ion in an mixing vessel so as to cause a reaction between the iron powder and the metal ions and remove the precipitated metal from the iron chloride waste solution. The etching waste liquid 11 containing iron chloride or the iron chloride waste liquid which is an intermediate of the etching waste liquid 11 containing iron chloride is supplied to the mixing vessel from the bottom of the mixing vessel, an iron-powder processed liquid which comes up through a fluidized bed is continuously taken out from the mixing vessel and is returned to the bottom portion of mixing vessel so as to form the fluidized bed in the mixing vessel, and metal ions having the lesser ionization tendency than iron ion are removed from the etching waste liquid 11 containing iron chloride or the iron chloride waste liquid to produce the iron-powder processed liquid.

12 Claims, 15 Drawing Sheets

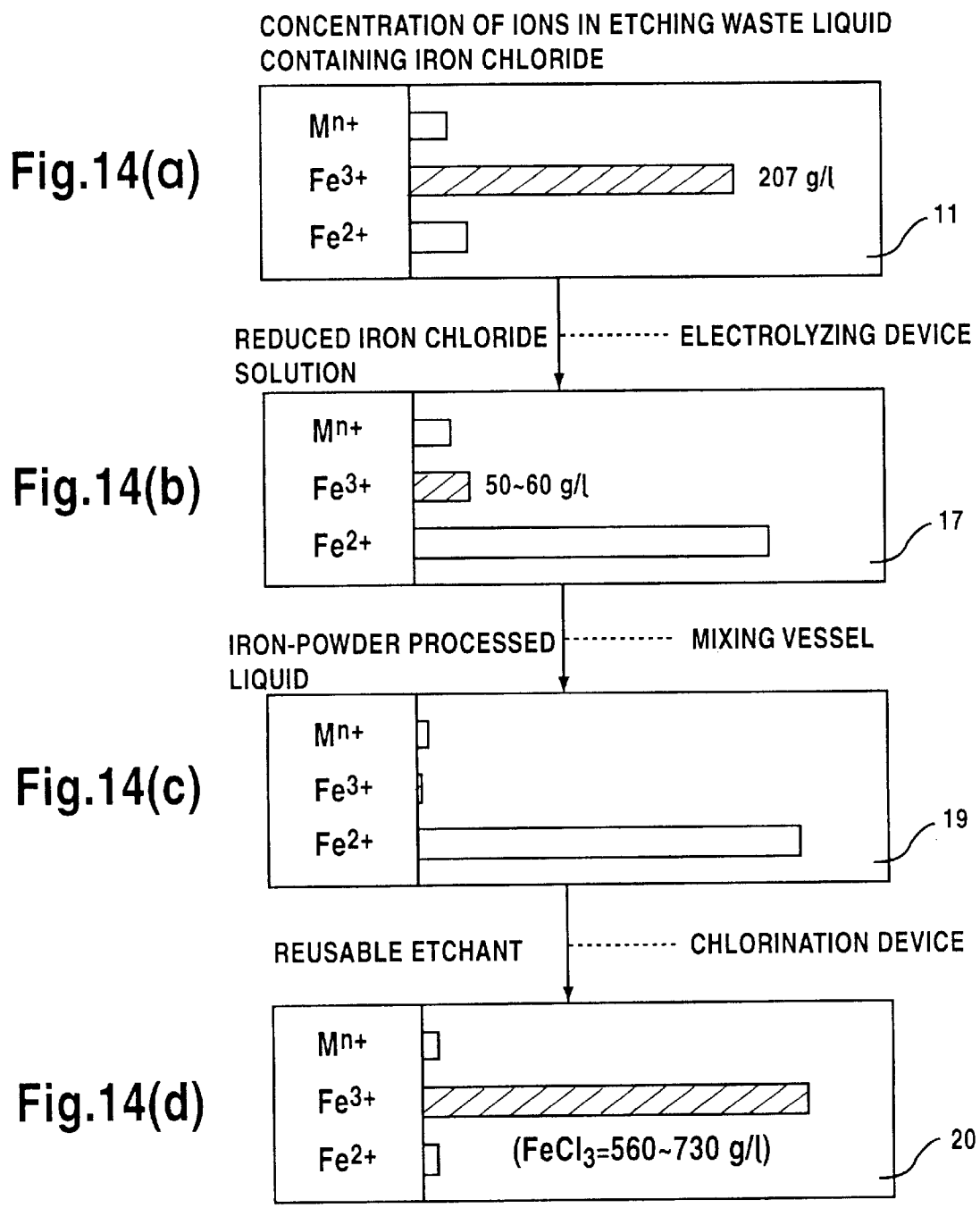

METHOD FOR RECOVERING ETCHANT FROM ETCHING WASTE LIQUID CONTAINING IRON CHLORIDE

BACKGROUND OF INVENTION

The present invention relates to a method for recovering etchant from etching waste liquid containing iron chloride, and more particularly a method for recovering etchant and other usable material from etching waste liquid containing iron chloride which is produced at the time of etching lead frames for IC (Integrated Circuit) or LSI (Large Scale Integrated circuit) or shadow mask of Brown tubes with etchant wherein metal ions such as copper ion and nickel ion having a lesser ionization tendency than iron ion are removed from the etching waste liquid.

Conventionally, lead frames for IC or LS1 or shadow masks of Brown tubes are produced by eroding portions of plate-like members made of a material such as copper or ferro-nickel alloy with etchant which contains a considerable amount of ferric chloride.

With such an etching processing, the ferric chloride is reduced to ferrous chloride so that the concentration of ferric chloride in the etchant is gradually lowered thus the etching efficiency of the etchant is also decreased. Accordingly, the etchant must be periodically replaced with fresh etchant which contains a sufficient ferric chloride while the used etchant having poor ferric chloride concentration is discharged from the system as etching waste liquid. The etching waste liquid, however, contains a considerable amount of usable metal ions such as copper ion or nickel ion besides iron ion after the etching processing. Furthermore, if these metal ions could be effectively removed from the etching waste liquid, reusable etchant could be obtained.

In view of the above, Japanese laid-open patent publication HEI 1-167235 proposes a method for recovering etchant and usable materials from etching waste liquid containing iron chloride. In this method, iron scrap or iron powder is mixed into etching waste liquid to reduce the metal ions such as copper ion and nickel ion having lesser ionization tendency than iron ion to recover usable metals such as copper and nickel and the liquid from which the usable metals are removed is utilized as etchant. In this method, however, the grade of the collected copper and nickel is low, while the use of iron scrap considerably lowers the speed of reaction between the etching waste liquid and the iron scrap.

To overcome such drawbacks, Japanese laid-open patent publication HEI 6-127946 proposes another method for processing etching waste liquid containing iron chloride. In this method, iron powder is mixed into strong acid waste liquid containing nickel and a small amount of chromium in the ferric chloride aqueous solution so as to control the oxidation-reduction potential (ORP) and iron ion concentration. Accordingly, copper and nickel ion eluted or dissolved in the strong acid waste liquid are precipitated in order as the result of electrolysis and foreign materials such as ferric hydroxide are removed thus producing etchant.

In the above Japanese laid-open patent publication HEI 6-127946, however, since the removal of metal ion in the etching waste liquid is carried out by mixing the iron powder with the etching waste liquid in the mixing vessel making use of an stirring blade driven by a power-operated motor, the method still has following drawbacks ① to ⑤.

① It is a prerequisite for the effective processing of the etching waste liquid to hold a considerable amount of iron powder in the etching waste liquid contained in the mixing vessel and to keep such iron powder in a favorable dispersed and floating condition in the etching waste liquid. However, the mixing vessel which produces a chemical reaction by the mechanical stirring blade suffers from the increase of processing capacity in terms of restriction on facility (e.g. a power-operated motor capable of agitating a large-sized stirring blade being extremely expensive) so that the method is not suitable for processing of a large amount of etching waste liquid.

② To uniformly disperse and suspend a considerable amount of iron powder having a high specific gravity in the etching waste liquid, power necessary for driving the stirring blade becomes large pushing up the running cost of the mixing vessel.

③ Since iron powder is stirred at a high speed by the mixing blade, iron powder comes into contact with the inner wall of the mixing vessel and the outer surface of the mixing blade. Accordingly, the wear rate of the mixing vessel and the stirring blade is accelerated resulting in increase of expense necessary for the maintenance of the mixing vessel.

④ Since iron powder tends to settle at corners of the mixing vessel thus producing dead spaces where the mixing of iron powder and etching waste liquid are not carried out sufficiently, the overall mixing efficiency is low. Accordingly, the mixing vessel necessitates a considerable processing time for reducing metal ion such as copper ion and nickel ion having lesser ionization tendency than iron ion in the etching waste liquid.

⑤ Although the iron powder having a small particle size is favorably suspended in the etching waste liquid, the use of iron powder having such a small particle size pushes up the running cost.

In an operation to reduce the foreign metals making use of the reaction between the etching waste liquid and the iron powder and thereafter remove the reduced foreign metals, in case the ferric chloride is still contained in the etching waste liquid, the iron powder is first consumed by the reaction between the iron powder and the ferric chloride in the mixing vessel so that the total amount of ferrous ion and ferric ion in the final etching waste liquid is increased. To regulate the concentration of iron ion in the etching waste liquid at a desired or predetermined level, the final etching waste liquid must be diluted by water. Such a dilution, however, produces an excessively large amount of etchant. In this manner, when the collected etching waste liquid is processed using the iron powder to recover the usable etchant, the amount of etchant after processing exceeds the amount of etching waste liquid before processing and there arises a problem on handling of such an excess of etchant.

Meanwhile, Japanese laid-open patent publication SHO 57-44724 proposes a method for producing iron powder which can be preferably used for the above-mentioned etchant and metal recovering method. This iron producing method substantially comprises following four processes. In the first process, dust which is produced in a converter which blows oxygen for refining of steel is collected in a wet dust collecting method and the dust is classified such that the classified dust includes equal to or less than 30% of the dust particles having a particle size less than 44 $\mu$m. In the second process, foreign materials such as scale and slag are peeled off from the dust particles having a large particle size by a wet-type finely crushing device. In the third process, peeled-off foreign materials are removed from the dust particles so as to produce metal iron. In the fourth process, the metal iron is refined to produce iron powder which can be preferably utilized in the above-mentioned etchant and metal recovering method.

However, in this method, since the process for producing iron powder by removing foreign materials from the dust is carried out by classification, thin layer sieve separation or magnetic separation, the process suffers from a low efficiency. Therefore, the production of the iron powder on a mass production basis is difficult. Furthermore, since the fourth process for refining metal iron is carried out by the combination of refining of iron oxide and the infiltration of dilute acid, the production of iron powder becomes costly.

SUMMARY OF INVENTION

Accordingly, it is an object of the present invention to provide a method for recovering etchant from etching waste liquid containing iron chloride, wherein a sufficient amount of etching waste liquid containing iron chloride can be reduced with a least power consumption making use of iron powder obtained by washing dust produced at a steel refining furnace, and metal ions such as copper ion and nickel ion having a lesser ionization tendency than iron ion (hereinafter sometimes referred to as 'foreign metal ion') in the etching waste liquid containing iron chloride can be reduced and collected as metals.

It is another object of the present invention to provide a method for recovering etchant from etching waste liquid containing iron chloride, wherein iron powder is mixed into the etching waste liquid so as to reduce and collect metals such as copper and nickel while an excess of etchant which is produced as the result of diluting to make the ferric ion in the etchant at a desired concentration can be minimized thus providing a compact facility and a low production cost.

To achieve above-mentioned objects, according to the first aspect of the present invention, there is provided a method for recovering etchant from etching waste liquid containing iron chloride, wherein iron powder is mixed with iron chloride waste solution containing metal ions such as nickel ion and copper ion having a lesser ionization tendency than iron ion in an mixing vessel so as to cause a reaction between the iron powder and the metal ions and precipitate metals, and precipitated metals are removed from iron chloride waste solution to produce iron-powder processed liquid and the iron-powder processed liquid is oxidized, the improvement being characterized in that the iron chloride waste solution is supplied to the mixing vessel and a part of the iron-powder processed liquid is taken out from an upper portion of the mixing vessel and is returned to a bottom portion of the mixing vessel so as to form a fluidized bed in the mixing vessel which holds the iron powder therein in a dispersed and floating state, and an excessive amount of the iron-powder processed liquid is taken out from the mixing vessel.

In this manner, since the iron-powder processed liquid which is free from foreign metal ion can be taken out from the upper portion of the mixing vessel and is returned to the bottom portion of the mixing vessel to form the fluidized bed in the mixing vessel, the fluidized bed can be always formed and held in a favorable condition by simply circulating the part of the iron-powder processed liquid in the mixing vessel.

Accordingly, even when the amount of iron chloride waste solution supplied to the mixing vessel is changed, the stable fluidized bed can be formed and held thus assuring a stable reaction between the iron chloride waste solution and the iron powder. Furthermore, since the iron-powder processed liquid is taken out from the upper portion of the mixing vessel and is returned to the bottom portion of the mixing vessel, the stable fluidized bed can be established without forming any dead spaces in the mixing vessel which make no contribution to the above-mentioned reaction in the mixing vessel so that the efficiency in removing foreign metal ions from the continuously supplied iron chloride waste solution is enhanced.

In a method for recovering etchant from etching waste liquid containing iron chloride, it is preferable to supply the iron chloride waste solution into the mixing vessel from the bottom portion of the mixing vessel since such an inflow of the iron chloride waste solution facilitates the formation of the fluidized bed in the mixing vessel. Furthermore, the contact ratio between the iron chloride waste liquid and the iron powder is increased thus promoting the processing speed in the mixing vessel.

In a method for recovering etchant from etching waste liquid containing iron chloride, it is preferable to form an iron powder separating portion at the upper portion of the mixing vessel which has a transverse cross-sectional area greater than that of a fluidized bed forming portion where the fluidized bed is formed, wherein the speed of the lifting liquid flow in the mixing vessel can be decelerated so that the lifting of the iron powder dispersed and floating in the fluidized bed can be restricted. In this manner, since the speed of the lifting liquid flow can be decelerated, the iron powder particles having a particle size greater than a predetermined particle size cannot come up to the iron powder separating portion so that even when the amount of iron chloride waste solution supplied to the mixing vessel is fluctuated to some extent, the upper end of the fluidized bed can be held in a predetermined fixed position thus assuring the removal of the foreign metal ions under a stable condition.

In a method for recovering etchant from etching waste liquid containing iron chloride, it is preferable that the iron chloride waste solution which is supplied to and processed in the mixing vessel is a reduced iron chloride solution which is produced by subjecting an etching waste liquid containing ion chloride to an electrolyzing processing such that a part of or almost the whole ferric ion in the etching waste liquid is reduced to ferrous ion. The reason is as follows. Even if the ferric ion contained in the etching waste liquid is reduced to the ferrous ion by the electrolyzing processing, the concentration of the total iron ion which consists of ferric ion and ferrous ion does not change. Accordingly, in the final process where the ferrous ion is oxidized into the ferric ion by blowing a chlorine gas, for example, to produce the reusable etchant, the total amount of iron does not change. This implies that the reusable etchant having a desired concentration can be produced in an exact amount without producing an excess.

Namely, in the conventional method which processes the etching waste liquid exclusively with iron powder, the ferric iron contained in the etching waste liquid reacts with iron powder to produce the ferrous ion so that the amount of iron contained in the processed liquid is increased more than a desired amount. Accordingly, in the final process where the ferrous ion is to be oxidized, a considerable excess is produced in addition to a desired amount of the etchant. Whereas, as mentioned previously, in the present invention, the ferric ion is reduced to the ferrous ion without using iron powder so that the production of excess etchant can be minimized thus enabling the reduction of cost necessary for processing the excess etchant and the construction of compact etchant production facilities. Furthermore, since the amount of iron powder necessary for processing of the iron chloride waste solution can be reduced, the processing cost can be lowered.

In a method for recovering etchant from etching waste liquid containing iron chloride, it is preferable that, in the electrolyzing processing, the mean electrolytic voltage in the etching waste liquid containing iron chloride is controlled in a range of 1 to 4.5 V (more preferably in a range of 1.5 to 3 V) and the current density thereof is controlled in a range of 2 to 40 A/dm$^2$ (more preferably in a range of 3 to 20 A/dm$^2$). With such a setting of the electrolytic voltage and the electric current in specific ranges in the electrolyzing operation, the ferric ion is reduced to the ferrous ion effectively without causing the precipitation of foreign metal ions such as copper ion and nickel ion contained in the iron chloride waste solution thus promoting the processing of the iron chloride waste solution. With respect to control of the electrolytic voltage, if the electrolytic voltage is below 1 V, such a voltage becomes substantially lower than a theoretical electrolytic voltage necessary for reducing the ferric ion to the ferrous ion so that a reducing effect cannot be obtained, while if the electrolytic voltage exceeds 4.5 V, the foreign metals such as copper and nickel contained in the etching waste liquid containing iron chloride are precipitated. With respect to control of the current density, if the current density is below 2 A/dm$^2$, since the capacity for processing the iron chloride waste solution is lowered, the facilities must be large-sized to process a desired amount of the iron chloride waste solution. If the current density exceeds 40 A/dm$^2$, the electrolytic voltage is elevated so that the cost for power is pushed up giving rise to an uneconomical operation. Furthermore, the load applied to the electrode is increased so that the electrode may suffer from a short lifetime and facilitates the precipitation of the foreign metals.

In the above-mentioned electrolyzing operation, it is preferable that a distance between an anode plate and a cathode plate in the electrolyzing vessel is set at 1.5 to 50 mm. With such setting of the anode-cathode distance in a specific range, the infiltration of chlorine gas into a cathode chamber can be restricted so that the oxidizing of the ferrous ion and the increase of electrolytic voltage can be restricted. If the anode-cathode distance is shorter than 1.5 mm, the chlorine gas generated on the anode plate may infiltrate into the cathode chamber through a membrane easily so that the ferrous ion may be oxidized (FeCl$_2$+(½) Cl$_2$→FeCl$_3$). Furthermore, since the supply of the etching waste liquid containing iron chloride to the cathode plate is substantially hampered, the precipitation of metals such as copper and nickel also occurs easily on the cathode plate. If the anode-cathode distance exceeds 50 mm, the electrolytic voltage is increased thus pushing up the power consumption cost which is unfavorable in the processing of the iron chloride waste solution. It is further preferable that the anode-cathode distance is set at 2 to 20

In the above-mentioned electrolyzing operation, the electrolyzing vessel may be constructed such that the vessel is partitioned by a liquid permeable membrane to define an anode chamber provided with the anode plate and a cathode chamber provided with the cathode plate and the etching waste liquid containing iron chloride is supplied to the cathode chamber through one part of the cathode chamber and the reduced iron chloride solution which is produced as the result of reducing processing in the cathode chamber is taken out from another part of the cathode chamber. Due to such a construction, mixing of the chlorine gas generated on the anode plate with the supplied etching waste liquid containing iron chloride or the reduced iron chloride solution can be effectively prevented thus enabling an efficient electrolyzing process.

The concentration of ferric ion remaining in the reduced iron chloride solution produced as the result of the above-mentioned electrolyzing processing should preferably be in a range of 10 to 120 g/l. The reason is that if the concentration of ferric ion in the reduced iron chloride solution is below 10 g/l, the amount of the ferrous ion reduced from the ferric ion per a unit current is decreased and copper ion and nickel ion contained in the solution are precipitated as metals, while if the concentration of ferric ion in the reduced iron chloride solution exceeds 120 g/l, the ferric ion reacts with the iron powder in the electrolyzing vessel so that the consumption of the iron powder is increased and the excess of the etchant produced is also increased corresponding to the increase of the consumption of the iron powder. Although the concentration of ferric ion in the reduced iron chloride solution is preferably in a range of 10 to 120 g/l, it is more preferable to set such a concentration in a range of 10 to 100 g/l.

In the electrolyzing processing, it is preferable to collect a portion of or the whole chlorine gas generated from the anode and blow off the chlorine gas into the iron-powder processed liquid taken out from the mixing vessel to partially oxidize the ferrous ion into the ferric ion. Due to such a provision, the production of unnecessary byproduct can be obviated thus facilitating the effective processing of the etching waste liquid containing iron chloride.

Furthermore, it is preferable to produce the iron powder used for the method of the present invention in such a manner that iron powder dust is collected from dust produced at a steel refining furnace and containing impurities such as CaO by means of a wet type dust collecting method and the iron powder dust is crushed and washed with water to remove the impurities and finally is subjected to an acid cleaning to produce the refined iron powder. With such a production process, the iron powder produced at the steel refining furnace can be effectively used. The inclusion of impurities such as CaO in the iron-powder processed liquid can be minimized.

The acid cleaning may be carried out in such a manner that a screw conveyor which is provided with an acid spray outlet at the downstream portion thereof is disposed in a slanted position in a sedimentation vessel, the iron powder dust is charged in and settled on the bottom of the sedimentation vessel, and acid is sprayed to the iron powder dust which is gradually discharged from the sedimentation vessel with the actuation of the screw conveyor. Due to such a provision, the iron powder which can be desirably used for reducing processing of the iron-chloride waste solution can be continuously produced on a mass production basis at a low cost.

It is preferable to set pH (hydrogen ion concentration) of the acid liquid held in the sedimentation vessel after acid cleaning falls in a range of 0.5 to 3. With such a pH setting, impurities such as CaO remaining in the refined iron powder can be held in an amount below a predetermined level and the acid liquid cost, the acid processing cost and the maintenance cost can be restricted in a reasonable range thus enabling further lowering of the production cost of the iron-chloride waste solution. The reason for setting the pH of the acid liquid at a range of pH 0.5 to 3 is that if the pH is below pH 0.5, the corrosiveness of the acid liquid becomes high so that the facilities including the sedimentation vessel and the screw conveyor necessitate a specific acid resistant treatment thus increasing the facilities construction and maintenance cost, while if the pH exceeds pH 3, the impurities such as scales and slags adhered to the iron powder cannot be dissolved sufficiently.

In the above-mentioned method for recovering etchant from etching waste liquid containing iron chloride according to the present invention, the iron chloride waste solution means an acid solution such as etching waste liquid containing iron chloride e.g. the ferrous chloride ($FeCl_2$) and the ferric chloride ($FeCl_3$). The iron chloride waste solution also contains metal ions such as copper ion, nickel ion and chromium ion which have a lesser ionization tendency than iron ion.

The iron powder preferably means the refined iron powder produced by refining the iron powder dust collected from dust produced at the steel refining furnace as mentioned previously and such a refined iron powder is porous and has a particle size of 44 to 250 $\mu$m and the shape of each particle is usually spherical. However, iron powder which is produced in other methods such as reduced iron powder or atomized iron powder can also be used in the above-mentioned method for recovering etchant from etching waste liquid containing iron chloride according to the present invention.

The fluidized bed means a region defined in the mixing vessel where a kinetic balance is held between the circulating flow in the mixing vessel lifting from the bottom of the mixing vessel and the weight and the viscosity resistance of the iron powder so that the iron powder floats and moves in a confined space at high density.

The iron-powder processed liquid basically means the solution which comes up through the fluidized bed and is free from the foreign metal ions such as copper ions and nickel ions. The iron-powder processed liquid, however, also means such a solution which includes a small amount (e.g. equal to or less than 20% of total amount of solution ) of floating but unseparated iron powder and other solid floating material in the solution.

The iron powder separating portion means a region defined at the upper portion of the mixing vessel and is disposed above the fluidized bed . However, there is no physical barrier or partition between the iron powder layer and the iron powder separating portion.

Since the iron powder separating portion expands the transverse cross-sectional area thereof in an upward direction, the flow speed of the iron-chloride solution fed to the mixing vessel from the bottom of the mixing vessel can be decelerated so that the infiltration of the iron powder floating from the fluidized bed to the iron powder separating portion can be prevented thus the iron powder is held in the fluidized bed.

BRIEF EXPLANATION OF DRAWINGS

FIGS. 14 (a),(b),(c),(d) are schematic views showing the transition of ion concentration during processing of iron chloride waste solution.

DETAILED EXPLANATION OF INVENTION

The method for recovering etchant from etching waste liquid containing iron chloride is hereinafter explained in conjunction with attached drawings.
(First Embodiment)

A waste liquid processing facility 10 which can be suitably used for carrying out the method for recovering etchant from etching waste liquid containing iron chloride according to the first embodiment of the present invention is explained in view of FIG. 1 to FIG. 12.

Figure 1:
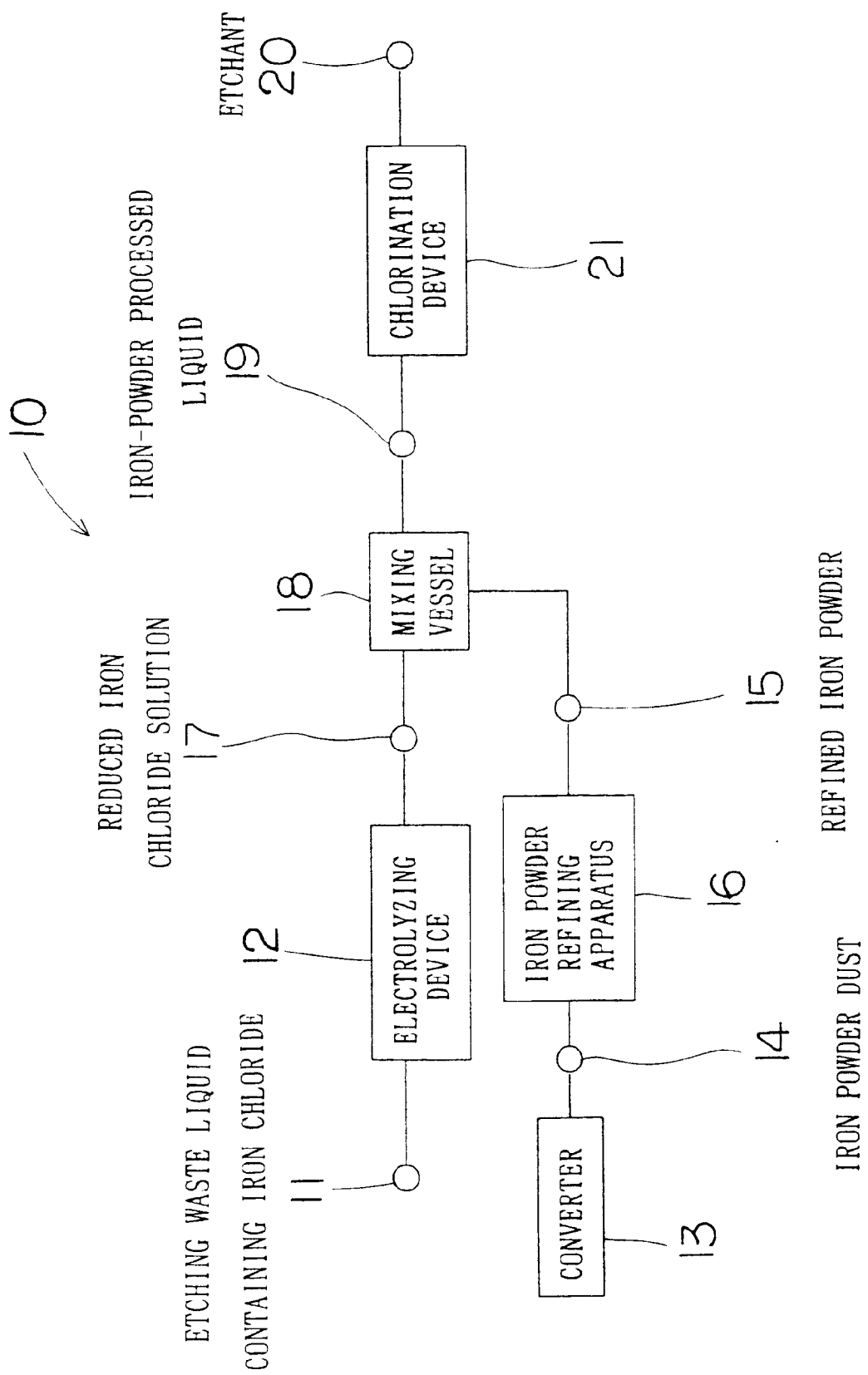
FIG. 1 is a schematic explanatory view showing the waste liquid processing facility used for carrying out the method for recovering etchant from etching waste liquid containing iron chloride according to the first embodiment of the present invention.

As shown in FIG. 1, the waste liquid processing facility 10 substantially comprises an electrolyzing device 12 which reduces the ferric ion in etching waste liquid 11 containing iron chloride (which is used as raw material in this invention) to ferrous ion, an iron powder refining apparatus 16 for obtaining refined iron powder 15 by refining iron powder dust 14 produced by a converter 13 which is a typical example of a steel refining furnace, a mixing vessel 18 for precipitating foreign metals by mixing a reduced iron chloride solution 17 obtained from the electrolyzing device 12 with the refined iron powder 15 obtained from the iron powder refining apparatus 16 and a chlorination device 21 for obtaining etchant 20 by oxidizing the ferrous ion in an iron-powder processed liquid 19 obtained from the mixing vessel 18 into the ferric ion.

The construction of respective devices which constitute the above-mentioned waste liquid processing facility 10 is explained hereinafter.

The construction of the electrolyzing device 12 is first explained in view of FIG. 2 to FIG. 7.

Figure 2:
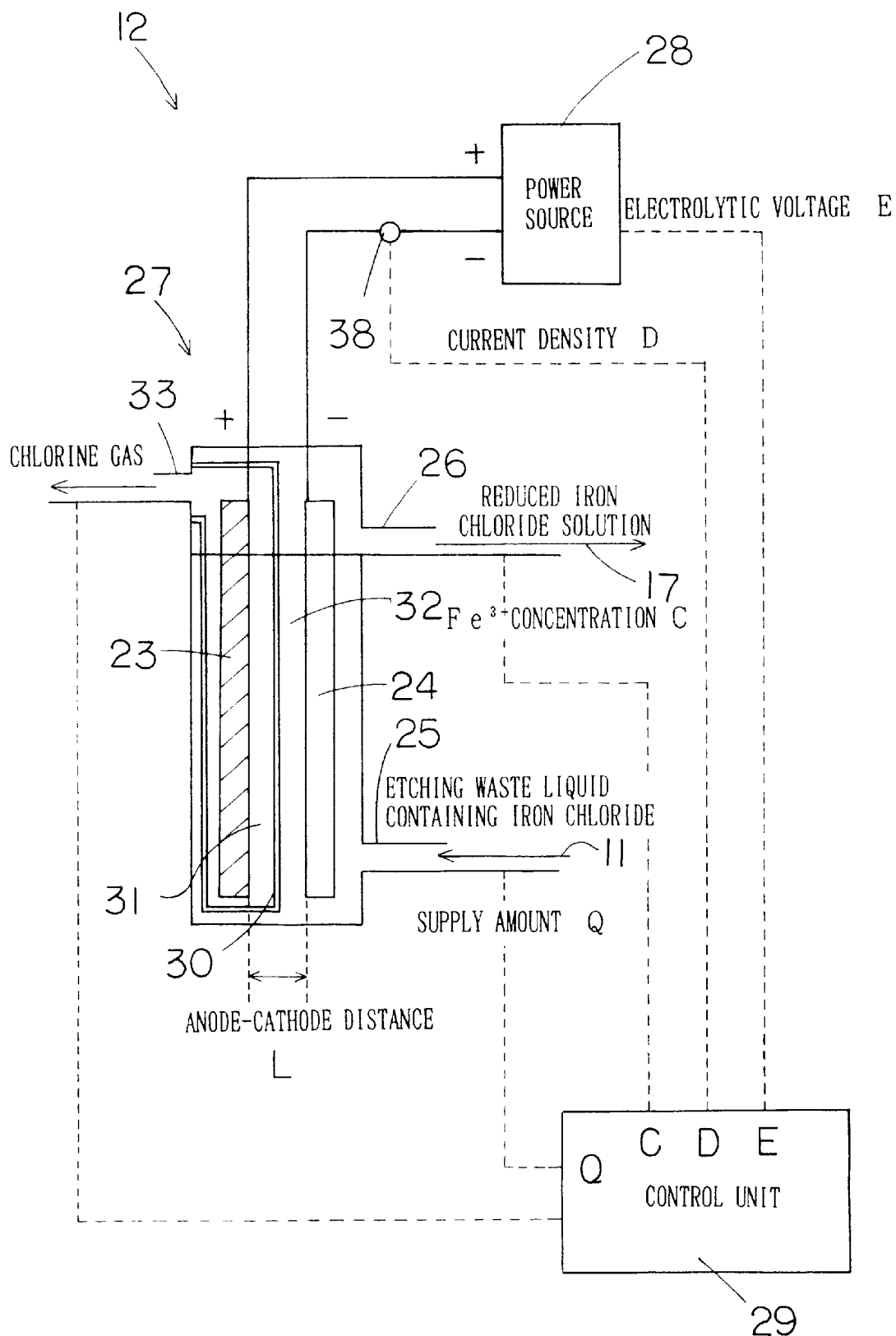
FIG. 2 is an explanatory view showing the construction of the electrolyzing device of the waste liquid processing facility.
Figure 3:
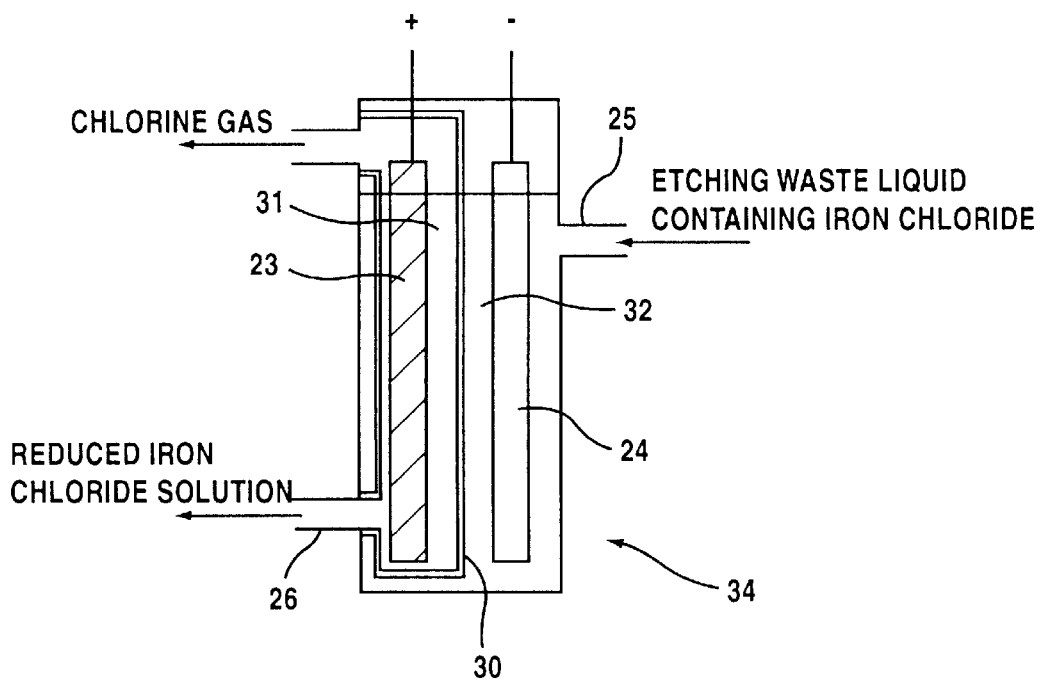
FIG. 3 to FIG. 7 are schematic views showing a plurality of layout patterns of supply ports of etching waste liquid and take-out ports of processed liquid in the electrolyzing device.
Figure 4:
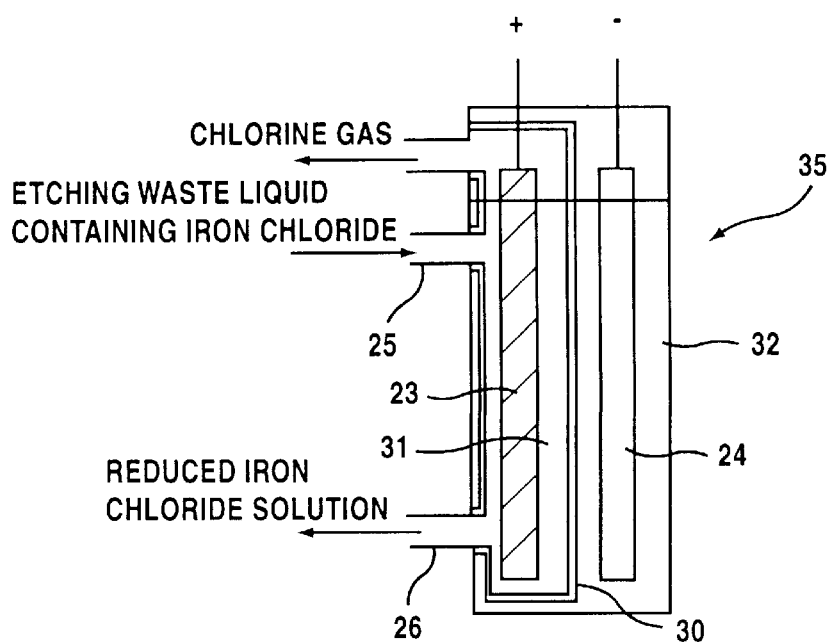
Figure 5:
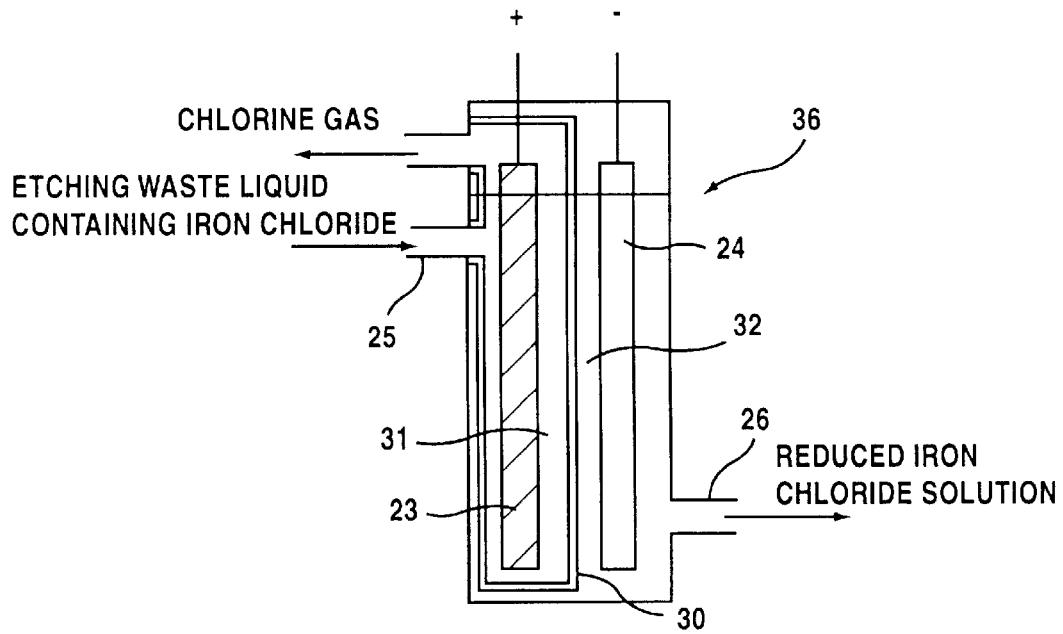
Figure 6:
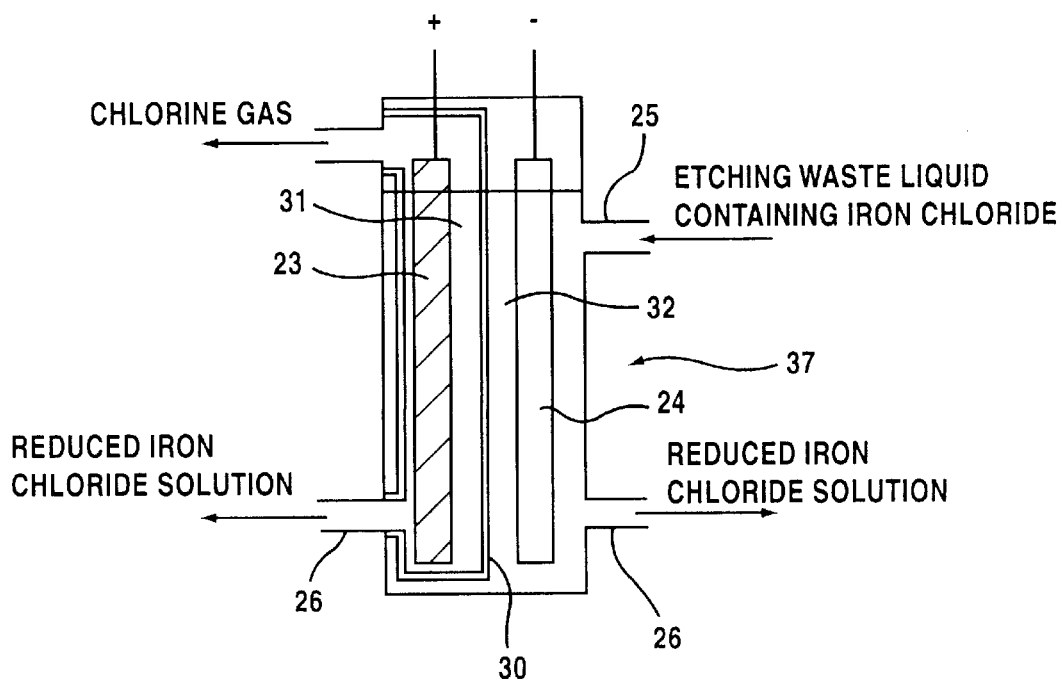

As shown in FIG. 2, the electrolyzing device 12 comprises an electrolyzing vessel 27 which includes an anode 23 and a cathode 24 in a parallelly spaced-apart manner therein and is provided with an liquid inlet 25 at the lower portion thereof for receiving the iron chloride etching waste liquid 11 and a liquid outlet 26 at the upper portion thereof for discharging the reduced iron chloride solution 17, a direct-current power source 28 which applies an electrolytic voltage to the anode 23 and the cathode 24, and a control unit 29 which receives necessary data such as current density (D) of the electrolyzing vessel 27, the concentration (C) of ferric ion in the reduced iron chloride solution 17 or an amount of chlorine gas generated from the anode 23 and controls an electrolytic voltage (E) and a supply amount (Q) of the etching waste liquid 11 containing iron chloride.

The electrolyzing vessel 27 is partitioned by a membrane 30 which is disposed around the anode 23 so as to define an anode chamber 31 and a cathode chamber 32 respectively. A chlorine gas exhaust port 33 is provided at the upper portion of the anode chamber 31 for collecting the chlorine gas generated from the anode 23.

In this embodiment, as shown in FIG. 2. the liquid inlet 25 provided for supplying the etching waste liquid 11 containing iron chloride to the electrolyzing vessel 27 and the liquid outlet 26 for discharging the reduced iron chloride solution 17 from the electrolyzing vessel 27 are arranged in a pattern where the liquid inlet 25 and the liquid outlet 26 are both disposed at the cathode chamber 32. Due to such a pattern, the amount of ferrous ion in the etching waste liquid 11 containing iron chloride as well as in the processed reduced iron chloride solution 17 which is to be oxidized by the chlorine gas generated from the anode 23 can be minimized thus the ferric ion in the etching waste liquid 11 containing iron chloride can be readily supplied to the surface of the cathode 24.

The liquid inlet 25 for the etching waste liquid 11 containing iron chloride and the liquid outlet 26 for the reduced iron chloride solution 17, however, can be arranged in other patterns as shown in FIG. 3 to FIG. 7, and in respective patterns, the liquid inlet 25 and the liquid outlet 26 may exchange their upper and lower positions from each other, if necessary.

Furthermore, although in FIG. 2 to FIG. 7, the electrolyzing vessels 27, 34 to 37 and 37a are shown such that each electrolyzing vessel 27, 34 to 37 and 37a respectively include a pair of anode 23 and cathode 24.

Figure 7:
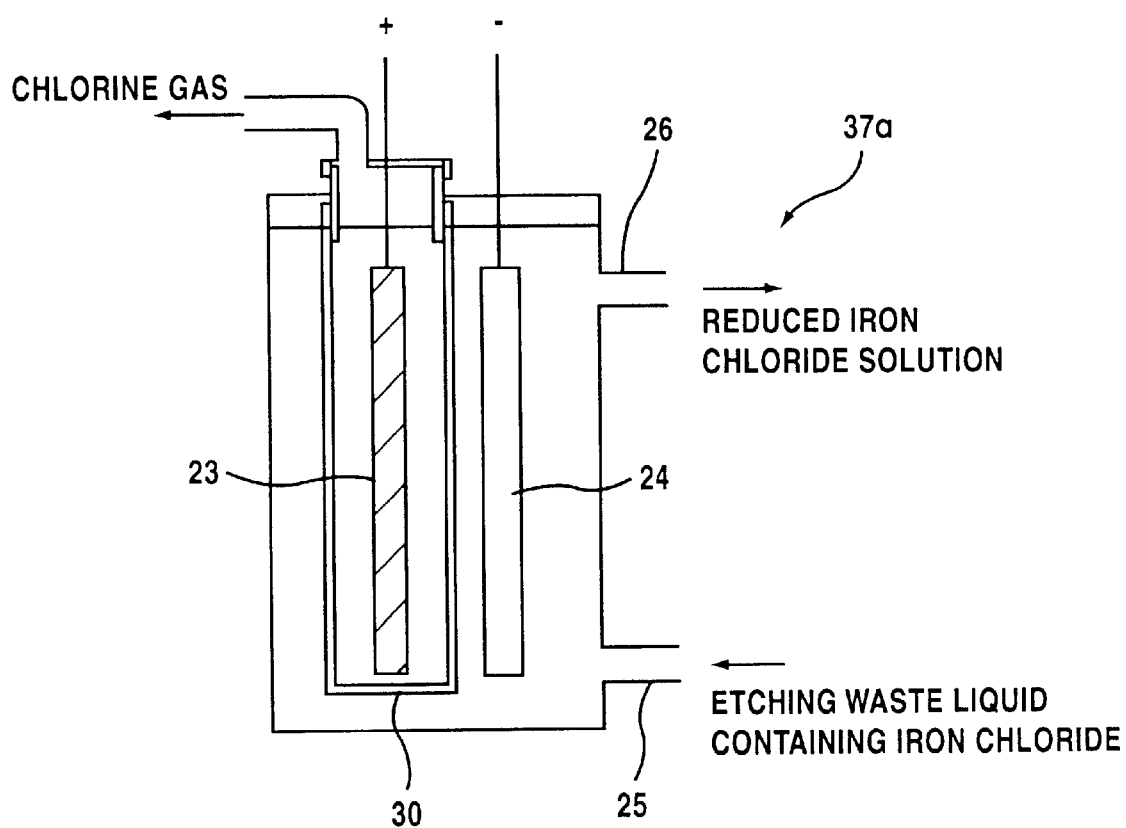

In practical use, each electrolyzing vessel 27, 34 to 37 and 37a may preferably be made of a plural pair of anode chambers 31 and cathode chambers 32 which are partitioned by a plurality of membranes and a plurality of anodes 23 and cathodes 24 are respectively disposed in these anode chambers 31 and cathode chambers 32. In FIG. 7, the anode 23 is completely partitioned by the membrane 30 having a cylindrical casing and the chlorine gas is discharged from the upper portion of the membrane 30. Furthermore, processing vessels which can be used for reducing the ferric ion to the ferrous ion are not limited to those electrolyzing vessels 27, 34 to 37 and 37a as disclosed in FIG. 2 to FIG. 7. Namely, other type of processing vessel such as a filter press type processing vessel or a bath-type processing vessel which is known can also be used in this embodiment. Either of known monopolar system or bipolar system can be used as a system for supplying electric power to the electrolyzing vessels.

The anode 23 may preferably be an electrode made of titanium which is partially coated with ruthenium oxide such as a DSE electrode or a DSA electrode which is produced by PELMEC CO. Although anode 23 may be an electrode made of titanium coated with platinum or graphite, the DSE electrode is preferable in terms of its low chlorine overvoltage, high oxygen overvoltage and low electric resistance.

The cathode 24 may be made of graphite, titanium, iron, stainless steel, copper, nickel, or nickel alloy and preferably be titanium or nickel alloy which exhibits high hydrogen overvoltage and low electric resistance.

The anode 23 and the cathode 24 may preferably be made of an expanded metal which is obtained by extending a metal plate having a plurality of slits. The anode 23 and the cathode 24 can take other shapes such as bar, plate, strip and the like.

As shown in FIG. 2, the membrane 30 is provided for blocking the chlorine gas generated from the anode 23 to enter the cathode chamber 32 so that the occurrence of the oxygen reaction ($FeCl_2+(\frac{1}{2})Cl_2 \rightarrow FeCl_3$) of the ferrous chloride in the cathode chamber 32 can be prevented, while the chlorine gas is smoothly discharged from the anode chamber 31 through the chlorine gas exhaust port 33. The membrane 30 is preferably made of a material which can be manufactured at a low cost and yet has a favorable liquid permeability while effectively blocking the infiltration of the chlorine gas to the cathode chamber 32. To be more specific, a filter cloth or an ion exchange resin are considered as the most suitable material for the membrane 30. In this embodiment, a filter cloth called PIREN FILAMENT PF 4000 (a registered trade mark) produced by IZUMI CO., LTD. JAPAN and having a thickness of 1 mm is used.

In this embodiment, although the distance L between the anode 23 and the cathode 24 is set at 8 mm, such a distance L can be changed, if necessary, preferably within a range of 1.5 to 50 mm, and more preferably within a range of 2 to 20 mm.

The control unit 29 is preferably made of a control device which includes a programmable controller which prestores a desired processing program and executes the processing based on the program. Of course, the processing can be executed without such a programmable controller. In such a case, an operator manually controls the supply current Q and the electrolytic voltage E and other conditions. To explain the function of this control unit 29, the magnitude i of the supply current supplied to the electrolyzing vessel 27 can be measured by an ammeter 38 interposed between the direct-current power source 28 and the electrolyzing vessel 27 and the current density D (=i/S) can be obtained by dividing the measured current value by an effective area S of the anode 23 and the cathode 24.

The concentration C of metal ion (concentration of ferric ion) in the reduced iron chloride solution 17 discharged from the electrolyzing vessel 27 can be measured by means of an ion counter or the like continuously or intermittently corresponding to the demand of accuracy in the processing.

In controlling the processing with the control unit 29, control data on the current density D and the concentration C of the ferric ion is fed to the control unit 29 and the control unit 29 adjusts the electrolytic voltage E and the supply amount Q of the etching waste liquid 11 containing iron chloride based on these data.

The iron powder refining apparatus 16 which is provided for producing the refined iron powder 15 by refining the iron powder dust 14 discharged from the converter 13 is hereinafter explained in conjunction with FIG. 8 to FIG. 10.

Figure 8:
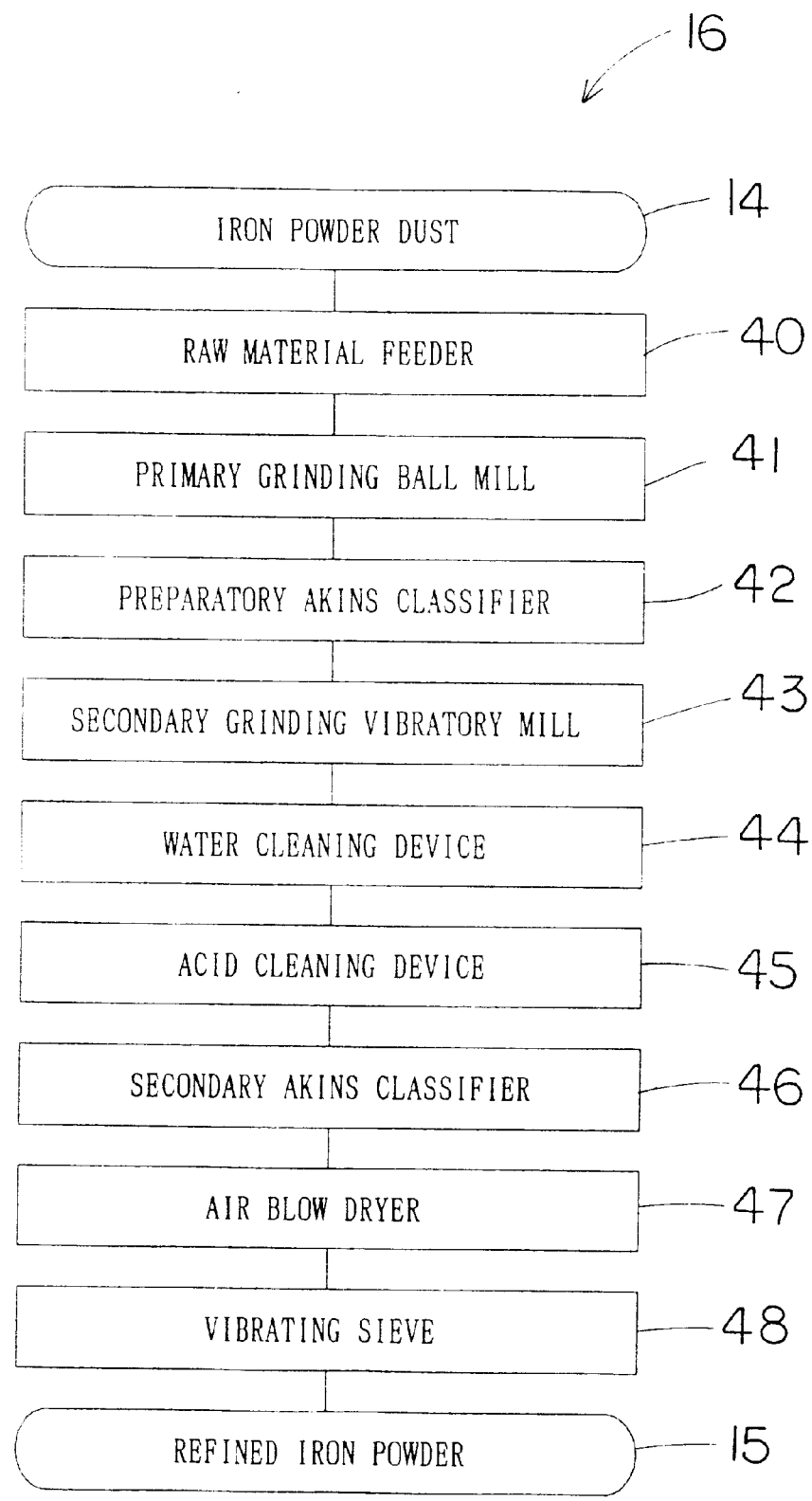
FIG. 8 is a schematic view showing the construction of the iron powder refining apparatus of the waste liquid processing facility.

As shown in FIG. 8, the iron powder refining apparatus 16 substantially comprises a raw material feeder 40 for feeding the iron powder dust 14, a primary grinding ball mill 41, a preparatory Akins classifier 42, a secondary grinding vibratory mill 43, a water cleaning device 44, an acid cleaning device 45, a secondary cleaning Akins classifier 46, an air blow dryer 47 and a vibrating sieve 48 which are arranged in series so that the refined iron powder 15 is produced.

The construction of the water cleaning device 44 and the acid cleaning device 45 which constitute the essential part of the iron powder refining apparatus 16 is hereinafter explained in view of FIG. 9 and FIG. 10. With respect to other devices of the iron powder refining apparatus 16, since the construction of these devices are known, the detailed explanation thereof is abbreviated.

As shown in these drawings, the water cleaning device 44 comprises a first sedimentation vessel 49 having an inversely conical-shaped configuration in which the iron powder dust 14 is charged as a material to be processed and a screw conveyor 50 which cleans the settled product in the first sedimentation vessel 49 with water and transfers the water-cleaned iron powder to the acid cleaning device 45. The acid cleaning device 45 comprises a second sedimentation vessel 51 having an inversely conical-shaped configuration into which the water-cleaned iron powder is charged from the downstream portion of the screw conveyor 50 of the water cleaning device 44 and a screw conveyor 52 which scoops and cleans the settled product with acid in the second sedimentation vessel 51, classifies the settled product and removes impurities from the iron powder and transfers the acid-cleaned iron powder to a succeeding processing step.

To be more specific, the screw conveyors 50, 52 are disposed in the first and second sedimentation vessels 49, 51 respectively in a slanted manner along the inclined walls of these vessels 49, 51 such that the inlet portions of these screw conveyors 50, 52 are sufficiently immersed in the sedimentation vessels 49, 51. The inclination angle of the screw conveyors 50, 52 should preferably be in a range of 10° to 50° against a horizontal plane. The downstream portions of the screw conveyors 50, 52 have a trough construction so that the upper parts thereof are fully opened.

Spiral shafts 53, 54 provided with helicoids are rotatably disposed in and along the screw conveyors 50, 52 so as to scoop and transfer upwardly the settled product on the bottom of the first and second sedimentation vessels 49, 51. When motors not shown in the drawings are driven, the spiral shafts 53, 54 gradually transfer the settled products settled on the bottom of the first and second sedimentation vessels 49, 51 toward the outlets 59, 59a of the screw conveyors 50, 52.

A water supply tube 55 and an acid supply tube 56 are respectively disposed above the slanted spiral shafts 53, 54. The water supply tube 55 is provided with a water spray outlet 57 for spraying the water to the settled product passing through the downstream portion of the screw conveyor 50 where the upper portion is open to the atmosphere while the acid supply tube 56 is provided with an acid spray outlet 58 for spraying the acid to the settled product passing through the downstream portion of the screw conveyor 52 where the upper portion is open to the atmosphere.

Accordingly, upon rotation of the spiral shafts 53, 54 disposed in the screw conveyors 50, 52, the settled products which are lifted upwardly through the screw conveyors 50, 52 are positively mixed and agitated with the cleaning water or cleaning acid which flow downwardly through the screw conveyors 50, 52 so that the fine particles having relatively smaller particle size compared to the iron powder and adhered to the settled product are washed away and descend toward the bottom of the sedimentation vessels 49, 51 and accumulated in the first and second sedimentation vessels 49, 51. Then, the water-cleaned iron powder and the acid-cleaned iron powder are respectively discharged from the outlets 59, 59a.

The above-mentioned preparatory Akins classifier 42 and the secondary cleaning Akins classifier 46 are also provided with screw conveyors respectively and have the same construction as that of the above-mentioned water cleaning device 44.

Figure 11:
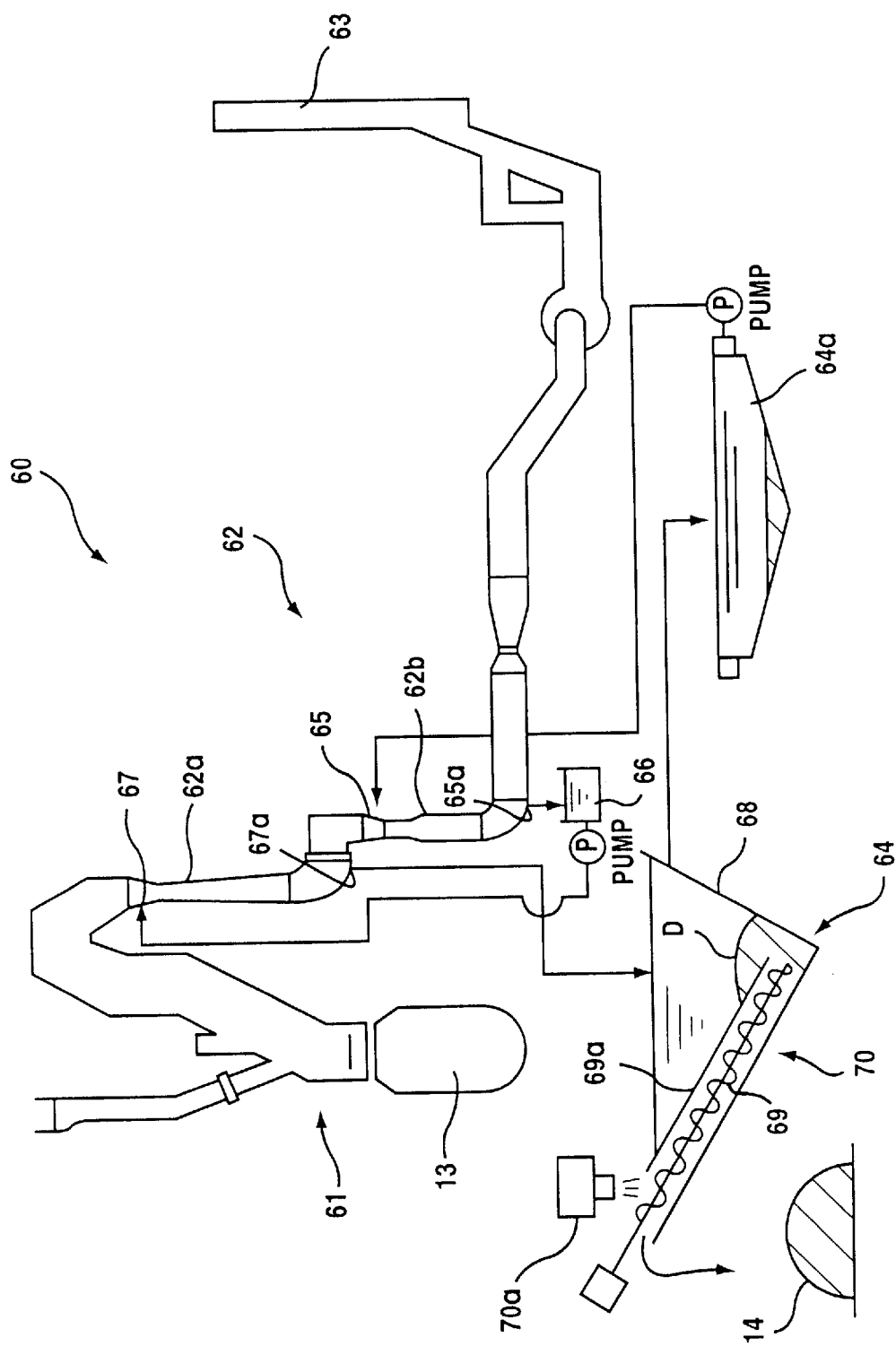
FIG. 11 is a view showing the layout of the iron powder collecting facility for obtaining iron powder dust.

The iron powder dust 14 which is supplied to the iron powder refining apparatus 16 from the converter 13 can be collected by means of an iron powder collecting facility 60 shown in FIG. 11.

As shown in FIG. 11, a hood portion 61 is disposed above the converter 13 for collecting the dust and gas generated from the converter 13. An upstream end of a dust and gas discharge system 62 is connected to the hood portion 61, while a chimney 63 which discharges non-noxious gas into atmosphere after an ensuing dust removal processing is connected to the downstream end of the dust and gas discharge system 62.

A first straight duct portion 62a is disposed at an upstream region of the dust and gas discharge system 62 and the first straight duct portion 62a is provided with a first water ejecting nozzle 67 and a first collected-dust discharge opening 67a at upper and lower ends thereof respectively. When water is ejected into the first straight duct portion 62a through the first water ejecting nozzle 67, the water comes into contact with the gas flowing through the dust and gas discharge system 62 and collects almost 95 percent of dust containing iron powder from the gas. The collected dust is discharged from the first collected-dust discharge opening 67a along with the ejected water and is supplied to a wet-type classifier 64 which will be described later. As shown in FIG. 11, a second straight duct portion 62b is connected to the downstream end of the first straight duct portion 62a by way of a horizontal shoulder portion and the second straight duct portion 62b is provided with a second water ejecting nozzle 65 and a second collected-dust discharge opening 65a at upper and lower ends thereof respectively. When water is ejected into the second straight duct portion 62b through the second water ejecting nozzle 65, the water comes into contact with the gas flowing through the dust and gas discharge system 62 and collects remaining dust (5 percent) contained in the gas. The collected dust is discharged from the second collected-dust discharge opening 65a along with the ejected water and is supplied to a dust processing reservoir 66. Since the amount of dust contained in the ejected water is considerably small, the ejected water is supplied to the first water ejecting nozzle 67 by means of a pump P and is effectively used as the water to be ejected into the first straight duct portion 62a.

As shown in FIG. 11, the wet-type classifier 64 includes a dust sedimentation vessel 68 into which the dust containing iron powder and discharged from the first straight duct portion 62a is supplied along with the ejected water and only the dust containing iron powder is settled on the bottom of the sedimentation vessel 68 as a settled dust D.

A screw conveyor 70 which comprises an elongated tube 69a and a spiral shaft 69 which is rotatably encased in the elongated tube 69a is disposed in the dust sedimentation vessel 68. An upstream end of the screw conveyor 70 is positioned on the bottom of the dust sedimentation vessel 68 and a downstream end of the screw conveyor 70 is protruded from the upper brim of the dust sedimentation vessel 68. A cleaning water supply device 70a is disposed above the downstream portion of the screw conveyor 70.

Due to such a construction, when the cleaning water is supplied to th downstream portion of the screw conveyor 70, minute particles adhered to the settled dust particles are selectively removed and fall down to the bottom of the sedimentation vessel 68 along the inner wall of the screw conveyor 70 and finally the dust (iron powder) having a relatively large particle size and being free from water is taken out from the upper portion of the screw conveyor 70.

Furthermore, as shown in FIG. 11, the supernatant liquid which is present at the upper portion of the dust sedimentation vessel 68 is taken out and fed to a thickener 64a located in the vicinity of the dust sedimentation vessel 68 and minute metal particles such as iron oxide particles are removed from the supernatant liquid thus producing a reusable water. This reusable water is supplied to the second water ejecting nozzle 65 and then is ejected to the second straight duct portion 62b. Due to such water circulation, the cost necessary for the iron powder collecting operation can be reduced.

Still furthermore, in the iron powder collecting facility 60, the front extremities of the first and second water ejecting nozzles 67, 65 of the dust and gas discharge system 62 are squeezed so that when the water is ejected, the water is vigorously mixed with the discharged gas or dust so that dust is more efficiently collected.

The construction of the mixing vessel 18 which mixes the reduced iron chloride solution 17 and the refined iron powder 15 and precipitates the foreign metals from the reduced iron chloride solution is hereinafter explained in view of FIG. 12.

As shown in the drawing, the mixing vessel 18 defines five regions, namely, the first region 71 to the fifth region 75 therein and these regions increase their respective planar or transverse cross sectional area in an elevating order from the bottom to the top. To be more exact, the mixing vessel 18 is a reactor which has a capacity of 17 m$^3$ and the maximum diameter thereof is approximately 3.2 m and it can contain, for example, an approximately 21 tons of the refined iron powder 15 used for the iron chloride waste solution.

The first region 71 which defines the uppermost portion of the mixing vessel 18 is a cylindrical region which has the largest planar or transverse cross sectional area. The upper end of the first region 71 opens to the atmosphere so as to enable the charging of the refined iron powder 15 into the mixing vessel 18. The second region 72 which is contiguous to the first region 71 is a region which is gradually tapered downwardly. These first and second regions 71, 72 constitute an iron powder separating portion (or free board) and this iron powder separating portion prevents the lifting of the iron powder which are floating in a dispersed state in the reduced iron chloride solution 17 from a fluidized bed (described later) into the iron powder separating portion.

Below the second region 72, the third region 73 which is made of a cylindrical tube having the same diameter as that of the bottom end of the second region 72 is disposed. The fourth region 74 which is made of a downwardly tapered construction is contiguously connected to the bottom end of the third region 73. The fifth region 75 which is made of a cylindrical tube of a small diameter is connected to the bottom end of the fourth region 74. The third to fifth regions 73 to 75 define the fluidized bed which can suspend iron powder in a high density making use of a circulating flow which is mainly made of the reduced iron chloride solution 17. The fluidized bed is depicted in hatching in FIG. 12.

Processed liquid partial take-out ports 76, 77 are formed in the side wall portions of the first and second regions 71, 72 which constitutes the iron powder separating portion, while a processed liquid return port 78 is formed in the side wall of the fifth region 75 which defines the lower portion of the fluidized bed. The processed liquid partial take-out ports 76, 77 are connected with a processed liquid return port 78 by way of the processed liquid circulating pipe 80 and a circulating pump 79 is mounted on the midst portion of the processed liquid circulating pipe 80. Upon actuation of the circulating pump 79, the iron-powder processed liquid 19 which contains an extremely small amount of iron powder or is completely free from the iron powder is taken out from the first and second regions 71, 72 through the processed liquid partial take-out ports 76, 77. Subsequently, iron-powder processed liquid 19 is fed to the fifth region 75 through the processed liquid circulating pipe 80 and the processed liquid return port 78. In this manner, with the actuation of the circulating pump 79, a self circulating flow is defined in the mixing vessel 18.

On the upstream end of the processed liquid circulating pipe 80, a first and second circulating flow regulating valves 81, 82 are mounted so as to regulate the amount of the iron-powder processed liquid 19 which enters the processed liquid circulating pipe 80 through two processed liquid partial take-out ports 76, 77, while a supply flow regulating valve 83 is mounted on the downstream end of the processed liquid circulating pipe 80. With the manipulation of these flow regulating valves 81, 82, 83, the amount of the circulating liquid can be readily regulated. Accordingly, irrespective of the amount of the reduced iron chloride solution 17 (or etching waste liquid 11 containing iron chloride) supplied to the mixing vessel 18 through a reduced iron chloride solution supply pipe 85 provided with a waste liquid supply valve 84 and the amount of the reduced iron chloride solution 17 (or etching waste liquid 11 containing iron chloride) supplied to the mixing vessel 18 through the processed liquid return port 78, the floating condition of the refined iron powder supplied into the mixing vessel 18 along with the circulating flow can be maintained in a desired range so that the fluidized bed can be readily formed.

Furthermore, since the processed liquid return port 78 opens at the side wall of the fifth region 75 where the diameter thereof is smallest and the iron powder tends to be settled, the part of the iron-powder processed liquid 19 fed to the fifth region 75 can effectively whirl the iron powder while preventing the occurrence of the dead spaces in the mixing vessel 18.

Still furthermore, the reduced iron chloride solution 17 (or etching waste liquid 11 containing iron chloride) can be supplied to the fifth region 75 of the mixing vessel 18 through a supply pipe 87 having a waste liquid supply valve 86 connected between the supply flow regulating valve 83 and the circulating pump 79 or supplied to the first region 71 of the mixing vessel 18 through the reduced iron chloride liquid supply pipe 85.

In the side walls of the first and second regions 71, 72, a pair of processed liquid discharge ports 88, 89 are formed in addition to the above-mentioned processed liquid partial take-out ports 76, 77. A processed liquid transfer pipe 91 which is provided with a pump 90 in the midst thereof has an upstream end thereof connected to these processed liquid discharge ports 88, 89, while the downstream end of the processed liquid transfer pipe 91 is connected with a chlorination device 21. Accordingly, with the actuation of the pump 90, the iron-powder processed liquid 19 obtained as the result of processing in the mixing vessel 18 is transferred to the chlorination device 21 by way of the processed liquid transfer pipe 91.

The flow amount of iron-powder processed liquid 19 discharged from the processed liquid discharge ports 88, 89 are regulated by a first and second discharge amount flow regulating valves 92, 93 which are mounted on the branched upstream portions of the processed liquid transfer pipe 91. In this manner, upon actuation of the pump 90, the iron-powder processed liquid 19 is discharged selectively from one of the regions which store the iron-powder processed liquids 19 of different properties respectively or a plurality of iron-powder processed liquids 19 are discharged from a plurality of regions so that the concentration of the iron ion in the iron-powder processed liquid 19 can be regulated thus the succeeding waste liquid processing can be carried out under an appropriate condition.

When the refined iron powder 15 in the mixing vessel 18 lacks, the corresponding amount of the refined iron powder 15 is supplied to the mixing vessel 18 through the upper opening of the mixing vessel 18.

Still furthermore, a solid waste discharge pipe 94a is connected to the bottom of the mixing vessel 18 and a solid waste discharge valve 94 is mounted on the solid waste discharge pipe 94a. Upon actuation of the solid waste discharge valve 94, the solid waste settled on the bottom of the mixing vessel 18 is removed.

The chlorination device 21 which produces the reusable etchant 20 by oxidizing the ferrous ion in the iron-powder processed liquid 19 discharged from the mixing vessel 18 to the ferric ion is explained hereinafter.

Although not specifically shown in the attached drawings, the chlorination device 21 receives the iron-powder processed liquid 19 having high corrosiveness so that it should preferably be a reactor vessel made of high acid-resistant material such as fiber-reinforced plastic. In the chlorination device 21, the chlorine gas produced by the electrolyzing device 12 and the like is blown into the iron-powder processed liquid 19 processed in the mixing vessel 18 to cause a bubbling therein. As a result, the ferrous ion in the iron-powder processed liquid 19 is partially or totally oxidized to produce the reusable etchant 20.

The above chlorination processing may be carried out in two steps wherein the chlorination is carried out using a simple process in the first step and then the chlorination is carried out using an standard process, whereby the efficiency of reaction between the iron-powder processed liquid 19 and the chlorine gas is further enhanced.

The manner in which the method for recovering etchant from etching waste liquid containing iron chloride according to the first embodiment of the present invention is hereinafter explained in details.

The manner for producing the refined iron powder 15 is first explained hereinafter.

Figure 9:
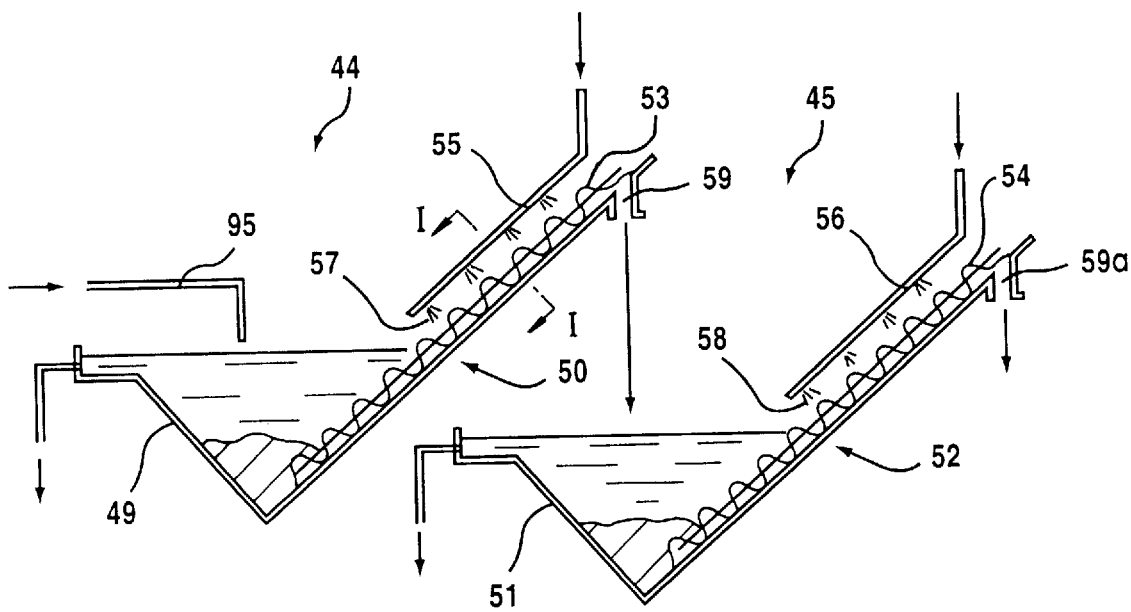
FIG. 9 is a side cross-sectional elevation of the water cleaning device and acid cleaning device which constitute the iron powder refining apparatus.

The refined iron powder 15 is obtained by refining the iron powder dust 14 delivered from the converter 13 with the iron powder refining apparatus 16 which is shown in FIG. 8 to FIG. 9.

Figure 10:
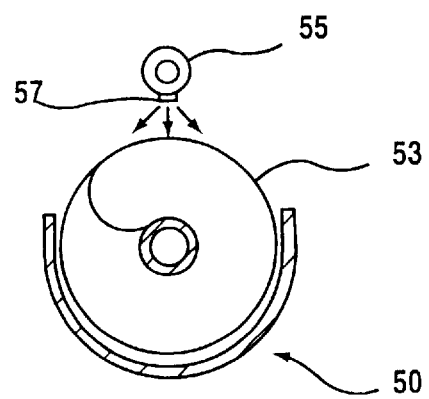
FIG. 10 is a cross-sectional view of the water cleaning device taken along line I—I of FIG. 9.

As shown in FIGS. 8 to 10, the iron powder dust 14 which is discharged from the wet-type classifier 64 shown in FIG. 11 and contains some water is fed to the primary grinding ball mill 41 by means of the raw material feeder 40. The primary grinding ball mill 41 is a cylindrical ball mill. The iron powder dust 14 is continuously supplied to the primary grinding ball mill 41 and is crushed. The rotating speed of the primary grinding ball mill 41 is preferably 20 to 36 rpm and the amount of balls which is stored in the primary grinding ball mill 41 and works as the crushing medium is in a range of 3 to 5 tons.

The amount of mixture made of the iron powder dust 14 and water fed to the primary grinding ball mill 41 is 200 to 1000 l/hr (mean value: 270 l/hr) and the concentration of the iron powder dust 14 is 50 to 80 wt % (mean value: 65 wt %).

The holding time of the iron powder dust 14 in the primary grinding ball mill 41 or the processing time is approximately 60 to 120 minutes and during this grinding process, the impurities contained in the iron powder dust 14 are partially peeled off from the iron powder dust 14.

The reasons for carrying out such a wet grinding process are as follows. Since the dust collected from the converter 13 is a wet dust which contains a considerable amount of water, if the dust is to be processed by a dry processing method, a drying process becomes necessary as a preparatory processing. Since the ensuing acid processing is carried out by a wet method, a drying process becomes necessary again so that the entire processing becomes uneconomical. Furthermore, the dry grinding process generates fine dusts which deteriorate the working environment. Accordingly, measures are to be taken to cope with such fine dusts and such measures inevitably increase the iron powder processing cost.

The product obtained as the result of the processing the iron powder dust 14 in the primary grinding ball mill 41 is supplied to a preparatory Akins classifier 42 which has the same construction as that of the wet-type classifier 64 shown in FIG. 11 so as to wash away the impurities peeled off from the iron powders in the primary grinding ball mill 41. The speed of liquid flow in the preparatory Akins classifier 42 which moves toward the brim of the sedimentation vessel of the classifier 42 and overflows from the sedimentation vessel of the classifier 42 is set at 3 to 10 m/hr (mean value: 5 m/hr), while the amount of cleaning water supplied to the downstream portion of the screw conveyor is 3 to 25 $m^3$/hr (mean value: 5 $m^3$/hr). Due to the cleaning operation carried out by the preparatory Akins classifier 42, the impurities which are peeled off from the iron power in the processed product is then separated and removed from the iron powder and minute iron power is also removed so that the particle size distribution of the iron powder can be shifted in a direction to increase the mean particle size of the iron powder.

The processed product discharged from the preparatory Akins classifier 42 is fed to the secondary grinding vibratory mill 43 where the processed product is pulverized. The secondary grinding vibratory mill 43 is a crusher with a vibrator and has a capacity of 1000 l. The amount of mixture made of iron powder dust 14 and water which is fed to the secondary grinding vibratory mill 43 is 200 to 1000 l/hr (mean value: 270 l/hr), while the concentration of the iron powder dust 14 is 50 to 80 wt % (mean value: 65 wt %). Due to this pulverizing operation in the secondary grinding vibratory mill 43, the impurities which still adhere to the iron powder dust 14 in the mixture is finely pulverized so that an ensuing operation to separate or remove the impurities from the iron powder dust 14 is enhanced.

Figure 15:
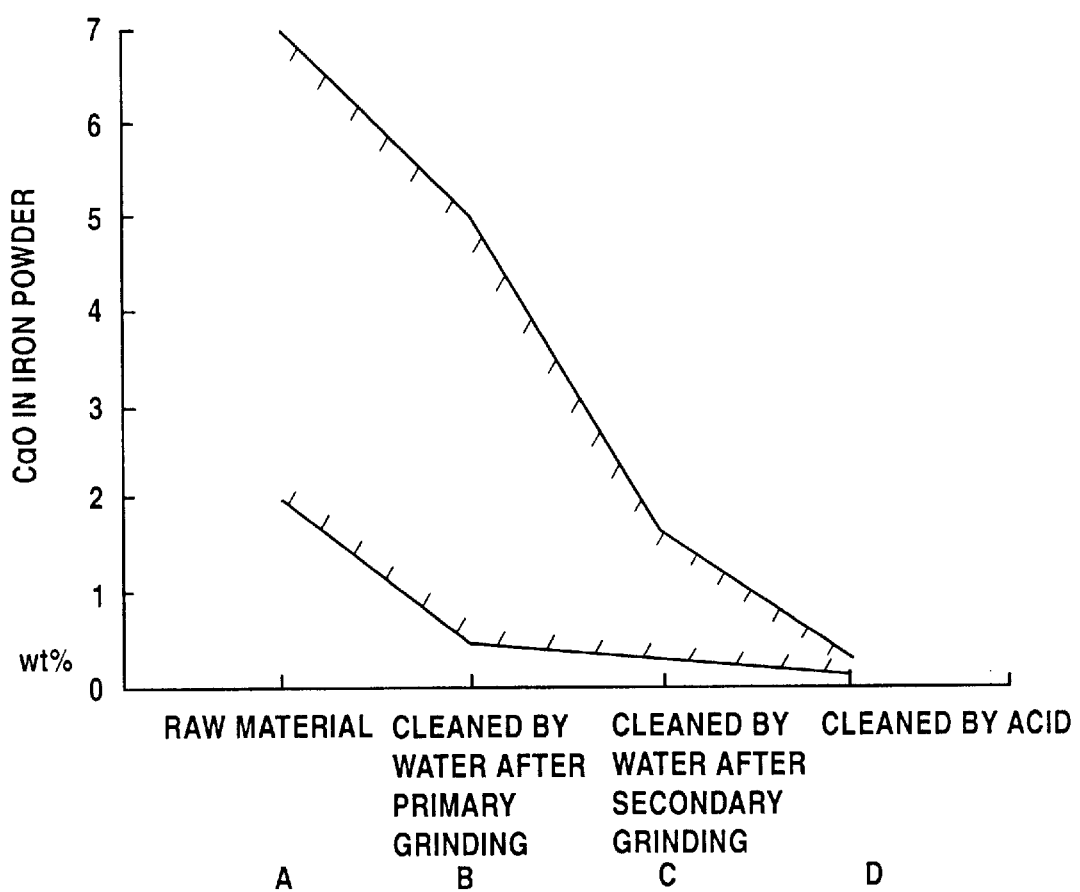
FIG. 15 is a schematic view showing the transition of concentration of CaO in the iron powder dust.

In FIG. 15, the change of the concentration of CaO which forms one of such impurities is shown. As can be readily understood from FIG. 15, the concentration of CaO was in a range of 2 to 7 wt % before the mixture was fed to the primary grinding ball mill 41 (FIG. 15(A)) and this concentration of CaO is dropped to a range of 0.5 to 5 wt % after cleaning operation by the preparatory Akins classifier 42 (FIG. 15(B)).

The processed product containing the iron powder dust 14, however, still contains a noticeable amount of impurities. Such iron powder dust 14 does not have an enough purity to be used for the process of recovering etchant from the iron chloride waste solution. Therefore, as shown in FIG. 9 and FIG. 10, it becomes necessary to use the water cleaning device 44 and the acid cleaning device 45 to wash away and classify the impurities from the iron powder dust 14.

For this purpose, the processed product containing the iron powder dust 14 is charged into the first sedimentation vessel 49 from the upper part of the water cleaning device 44 by way of an iron powder dust feed pipe 95. In the first sedimentation vessel 49, the iron powder particles having a large particle size in the iron powder dust 14 are gradually settled to form a layer of settled product on the bottom of the first sedimentation vessel 49. Subsequently, the spiral shaft 53 of the screw conveyor 50 is rotated by a power-operated motor to discharge the cleaned iron powder as described hereinafter.

Along with the above operation, the cleaning water is supplied to the downstream end of the screw conveyor 50 at a mean supply speed of a 3 to 25 m³/hr from the water spray outlet 57 of the water supply tube 55 to form a downward cleaning water flow in the screw conveyor 50. As mentioned previously, since the processed product containing the iron powder dust 14 is supplied to the first sedimentation vessel 49 by way of the iron powder dust feed pipe 95, an overflow stream which lifts up in the first sedimentation vessel 49 is generated. Since such an overflow stream contains minute iron powder and dust, the overall specific gravity of the overflow stream is relatively small. Adjusting the lifting speed of this overflow stream at a range of 3 to 10 m/hr (mean value: 5 m/hr), the iron powder dust 14 is separated and refined.

Due to such an operation, the minute particles contained in the iron powder dust 14 are washed away as an overflow and the iron powder dust having a large particle size can be discharged from the downstream end of the screw conveyor 50 selectively. The iron powder dust 14 obtained after two ball mill grinding operations and the water cleaning operation is almost free from impurities. Namely, as shown in FIG. 15(C), the concentration of CaO is reduced to a range of 0.3 to 1.7 wt % and the water cleaned iron powder which has shifted the particle size distribution in a direction to increase the particle size is obtained.

The water cleaned iron powder is then charged into the second sedimentation vessel 51 from the outlet 59 formed at the downstream end of the screw conveyor 50 positioned at the upper part of the water cleaning device 44. The iron powder particles having a relatively larger particle size are gradually settled to form a layer of settled product on the bottom of the second sedimentation vessel 51. Subsequently, the spiral shaft 54 of the screw conveyor 52 is rotated by a power-operated motor to discharge the acid cleaned iron powder from the second sedimentation vessel 51. By adjusting the amount of water cleaned iron powder into the second sedimentation vessel 51 and the amount of acid cleaned iron powder discharged from the second sedimentation vessel 51, an overflow stream is formed in the second sedimentation vessel 51. The lifting speed of the overflow stream is adjusted to a range of 3 to 10 m/hr (mean value: 5 m/hr) to facilitate the separating and refining operations in the second sedimentation vessel 51.

Along with the above operation, the liquid obtained after water cleaning in the secondary Akins classifier 46 is taken out from the secondary Akins classifier 46 and is added to concentrated sulfuric acid having the specific gravity of 1.9 and the concentration of 98% respectively to produce a diluted acid liquid and this diluted acid liquid is supplied to the downstream end of the screw conveyor 52 by way of the acid spray outlet 58 of the acid supply tube 56 at a supply speed of 30 to 100 l/hr to form a downward cleaning acid flow in the screw conveyor 52. In this acid cleaning operation, the amount of liquid after water cleaning added to the concentrated sulfuric acid for dilution is determined such that pH of the liquid held in the second sedimentation vessel 51 after acid cleaning falls in a range of 0.5 to 3.

In the above operation, the minute iron powder particles contained in the water cleaned iron powder is washed away from the large iron powder particles by the acid liquid and the large iron powder particles are settled on the bottom of the second sedimentation vessel 51. Furthermore, during a process to discharge the settled large iron powder particles through the screw conveyor 52, the impurities which are still adhered to the large iron powder particles are dissolved and washed away by the acid liquid which flows backwardly toward the bottom of the second sedimentation vessel 51 and the overflow stream in the second sedimentation vessel 51. Accordingly, the large iron powder particles including the refined iron powder are selectively discharged from the outlet 59a of the screw conveyor 52, while a supernatant liquid in the second sedimentation vessel 51 is overflown from the upper brim of the second sedimentation vessel 51.

Subsequently, as shown in FIG. 8, with the actuation of the secondary Akins classifier 46 which has the similar construction as that of the water cleaning device 44, the product obtained by the above-mentioned acid cleaning is cleaned with water. In this water cleaning operation, the cleaning water which may be an industrial water is supplied to the secondary Akins classifier 46 at a water supply speed of 1 to 10 m³/hr so as to remove the remaining acid liquid on the iron powder. The processed product obtained as the result of the acid processing is fed to an air blow dryer 47 and water is removed from the iron powder in the air flow at a temperature of 150 to 250° C. Table 1 shows the particle size distribution of the refined iron powder 15 measured after the drying operation.

TABLE 1

| particle size range G (μm) | rate (wt %) |
| --- | --- |
| 150< G ≦750 | 0 ~ 20 |
| 105< G ≦150 | 5 ~ 40 |
| 74< G ≦105 | 20 ~ 60 |
| 63< G ≦74 | 5 ~ 25 |
| 44< G ≦63 | 10 ~ 30 |
| G ≦44 | 1 ~ 19 |

As a typical composition of the refined iron powder 15 having particle size ranges shown in Table 1, the refined iron powder 15 includes Fe, FeO and $Fe_2O_3$ and the total Fe amount in the refined iron powder 15 is equal to or more than 96 wt %. Namely, the refined iron powder 15 includes equal to or more than 92 wt % of metal Fe, equal to or less than 6 wt % of FeO, equal to or less than 0.5 wt % of CaO, equal to or less than 0.1 wt % of $SiO_2$ and equal to or less than 0.7 wt % of C.

As a final step, the refined iron powder 15 is classified using a vibrating sieve 48 which is provided with a Tylers standard sieve which has a sieve opening ranging from 100 to 150 mesh. Making use of such a vibrating sieve 48, the refined iron powder 15 of a desired particle size can be obtained which may be effectively used corresponding to the kinds of impurities or foreign materials to be removed from the etching waste liquid. For example, the oversized iron powder particles may be used for removal of copper in the etching waste liquid processing, while the downsized iron powder particles may be used for removal of nickel.

In the Tylers standard sieves, the sieve openings of 100 to 150 mesh indicate 147 μm and 104 μm respectively.

In this manner, the refined iron powder 15 which contains the impurities (CaO) in an amount of 0.01 to 0.10 wt % which falls below an allowable limit as shown in FIG. 15(D) can be produced. Accordingly, while considering an economy of the processing, the sulfuric acid unit requirement and the hydrochloric acid unit requirement necessary for producing 1 ton of refined iron powder must be in a range of 10 to 400 l and in a range of 25 to 700 l respectively.

The manner in which the reduced iron chloride solution 17 is produced from the etching waste liquid 11 containing iron chloride by the electrolyzing device 12 is explained.

As shown in FIG. 2, the etching waste liquid 11 containing iron chloride which is produced as a result of applying an etching on lead frames or the like is supplied to the electrolyzing vessel 27 by way of a waste liquid supply pipe and through the liquid inlet 25. In the electrolyzing vessel 27, the ferric ion ($Fe^{3+}$) in the etching waste liquid 11 containing iron chloride is reduced to the ferrous ion ($Fe^{2+}$) to produce the reduced iron chloride solution 17. This reducing operation is carried out for collecting and making use of the chlorine gas. This reducing operation is also carried out for preventing a phenomenon in which the refined iron powder 15 is oxidized and dissolved by the ferric ion during an ensuing operation to remove the metal impurities using the refined iron powder 15 and eventually the concentration of the ferrous ion is excessively increased.

In the etching waste liquid 11 containing iron chloride which is a solution, the concentration of the ferric ion and the concentration of the ferrous ion are 100 to 250 g/l and 5 to 70 g/l respectively. The etching waste liquid 11 contains chlorine ion ($Cl^{-2}$) and HCl as well as foreign metal ion such as nickel ion ($Ni^{2+}$) and copper ion ($Cu^{2+}$)

When the etching waste liquid 11 containing iron chloride is supplied to the electrolyzing vessel 27, following reactions take place on the anode 23 and the cathode 24 respectively.

Anode: $2Cl^{-} \rightarrow Cl_2\uparrow + 2e^{-}$ 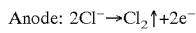

Cathode: $Fe^{3+} + e^{-} \rightarrow Fe^{2+}$ 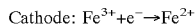

Namely, the chlorine gas is produced on the anode 23, while the ferric ion is reduced to ferrous ion on the cathode 24. These two reactions can be expressed by a following combined or total reaction.

$FeCl_3 FeCl_2 + (½) Cl_2 \uparrow$ 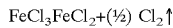

The changing amount ΔG of free energy in the total reaction can be calculated as the changing amount of free energy G of each component before and after the reaction and such changing amouut ΔG is +13784 cal/mol. The theoretical electrolytic voltage $E_0$ can be obtained employing a theoretical formula $E_0 = \Delta G/zF$. Here, F is a Faraday constant and z is number of mols which contribute to the reaction. Putting physical values to the formula, the theoretical electrolytic voltage can be obtained as $E_0$ being 0.5977 volts. $FeCl_3$ is electrolyzed by holding the electrolytic voltage above the theoretical electrolytic voltage $E_0$ so as to produce the chlorine gas. Preferably, the electrolytic voltage can be set at, for example, 1 volt which produces the chlorine gas but does not reduce copper ion and nickel ion.

Considering factors such as the efficiency of current, efficiency in converting alternate current to direct current, the electrolytic voltage of the electrolyzing vessel 27 and the like, the actually necessary electric power should be chosen in a range of 1000 to 3500 kWh per ton of chlorine gas corresponding to the size and other specifications of the electrolyzing device 12.

The method for recovering etchant from etching waste liquid containing iron chloride is further explained in view of FIG. 13 which shows the transition of electrolytic voltage E, the current density D and the ferric ion concentration C of the reduced iron chloride solution 17 in the electrolyzing device 12.

As shown in FIG. 2, after the electrolyzing vessel 27 is filled with the etching waste liquid 11 containing iron chloride at a predetermined level, the electrolyzing voltage E is applied between the anode 23 and cathode 24 until the electric current which flows between the electrodes 23, 24 becomes stable.

Then, the etching waste liquid 11 containing iron chloride is continuously supplied to the electrolyzing vessel 27 through the waste liquid supply pipe and the liquid inlet 25 at a desired supply amount Q (for example, 4.6 l/hr per a pair of electrodes (a unit cell) having a surface area of 1 $m^2$ respectively) and the reduced iron chloride solution 17 of the same amount as that of the supply amount Q is discharged from the liquid outlet 26.

Figure 13A:
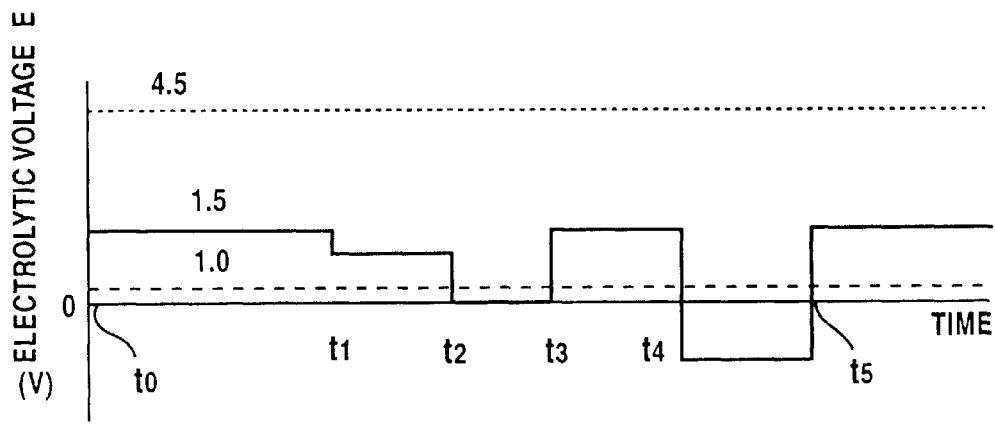
FIGS. 13 (a),(b),(c) are timing charts showing the transition of electrolytic voltage, current density and concentration of ferric ion in the electrolyzing device.

As shown in FIG. 13(a), the time that the stable electrolyzing operation starts is expressed as $t_0$ and the electrolytic voltage E is set to 1.5 V which falls in a controllable range of 1 to 4.5 V.

Figure 13B:
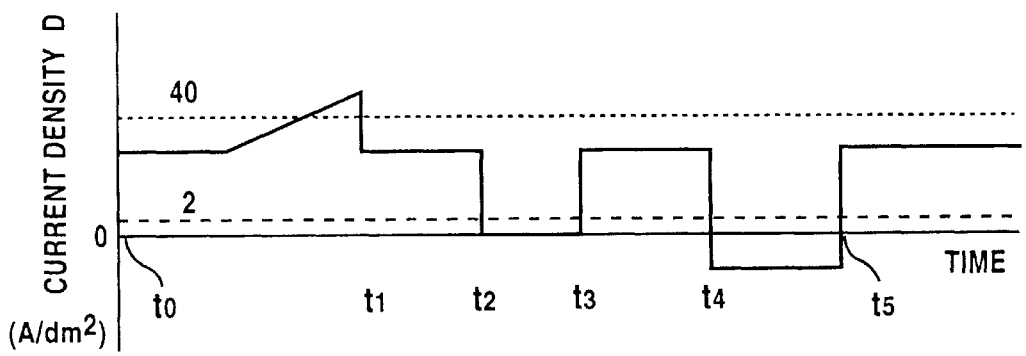

As shown in FIGS. 13(b),(c), the current density D is in a predetermined range of 2 to 40 A/$dm^2$ while the concentration C of ferric ion is in a predetermined range of 50 to 60 g/l which falls in a range of 10 to 120 g/l. The chlorine gas produced during the electrolyzing operation is discharged from the chlorine gas exhaust port 33 so as to provide a desired electrolyzing condition in the electrolyzing vessel 27.

As shown in FIG. 13, in case that the concentration of the ferric ion C deviates from the predetermined range (at time $t_1$), the electrolytic voltage E is adjusted so as to obtain the reduced iron chloride solution 17 which has the concentration C of ferric ion in the predetermined range.

In case that the foreign metal (e.g. copper) is precipitated on the cathode 24, the etching waste liquid It containing iron chloride is supplied to the portion of the cathode 24 where the copper is precipitated and such copper is again dissolved by a following reaction between the ferric chloride in the liquid 11 and the copper.

$2FeCl_3 + Cu \rightarrow 2FeCl_2 + CuCl_2$ 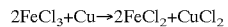

As another method, as shown in FIG. 13, the electrolytic voltage E is held at zero during a time interval of $t_2$ to $t_3$ or apply a reverse voltage during a time interval of $t_4$ to $t_5$ to dissolve the precipitated copper again.

Figure 13C:
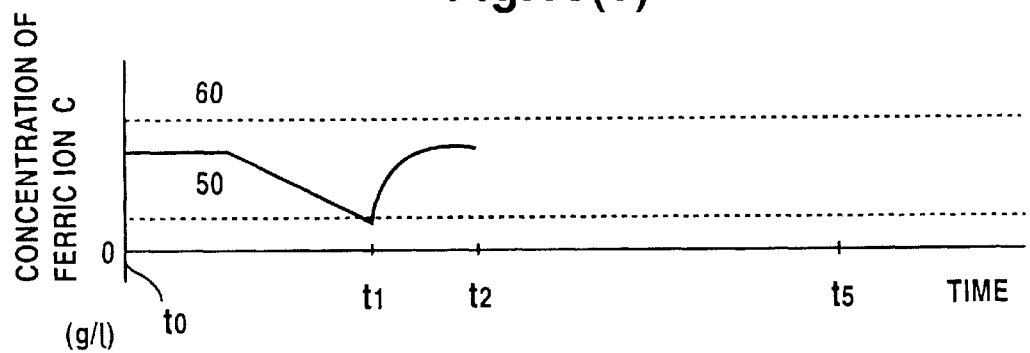

In FIG. 13(c), since the electrolyzing operation becomes stable after a lapse of time $t_2$, the change of ferric ion concentration is abbreviated.

The temperature of the electrolyzing liquid during electrolyzing processing is regulated in a range of 30 to 100 °C. If the temperature is lower than 30° C., the electric resistance of the electrolyzing liquid becomes high so that copper and nickel tend to be precipitated, while if the temperature exceeds 100° C., an unfavorable boiling phenomenon of the electrolyzing liquid occurs.

The concentration of ferric ion ($Fe^{3+}$) in the reduced iron chloride solution 17 which is obtained by this electrolyzing process is shown in FIG. 14, where the transition of the concentration of ferric ion is shown schematically. For example, before the electrolyzing operation, the concentration of ferric ion in the etching waste liquid 11 containing iron chloride was 207 g/l as shown in FIG. 14(a). After the electrolyzing operation, the concentration of ferric ion in the etching waste liquid 11 containing iron chloride was in a range of 50 to 60 g/l as shown in FIG. 14(b). The concentration of nickel ion ($Ni^{2+}$) and copper ion ($Cu^{2+}$) were held at almost the same level before and after the electrolyzing operation as shown in FIG. 14(a) and FIG. 14(b). The nickel ion and the copper ion are both expressed as $M^{n+}$ in FIG. 14.

Since the concentration of the ferric ion is set at a level slightly higher than the concentration of the foreign metal ion in the reduced iron chloride solution 17, during the electrolyzing operation, the foreign metals are not precipitated thus an unnecessary electric power consumption can be obviated providing an efficient electrolyzing operation.

In following Table 2, the electrolyzing conditions of the electrolyzing device 12 under a stable operating condition and the result of the electrolyzing operation are shown. As can be readily understood from Table 2, the rate of effective electric current for obtaining the chlorine gas against the total electric current was 67%.

TABLE 2

| electrolytic conditions | anode material | DSE electrode |
|---|---|---|
| | cathode material | titanium |
| | membrane material | PF 4000 |
| | anode-cathode distance L | 8 mm |
| | electrolytic voltage E | 1.5 V |
| | electric current density D | 5 A/dm² |
| | supply port of etching waste liquid containing iron chloride | in cathode chamber |
| | discharge port of reduced iron chloride solution | in cathode chamber |
| | supply amount of etching waste liquid containing iron chloride | 4.6 l/hr |
| results of electrolyzing operation | efficiency of electric current for collecting chlorine gas | 67% |
| | concentration of ferric ion in reduced iron chloride solution | 55 g/l |
| | concentration of ferrous ion in reduced iron chloride solution | 172 g/l |

The manner of reducing and removing the foreign metal ion such as copper and nickel ions contained in the reduced iron chloride solution 17 using the refined iron powder 15 is explained hereinafter in view of FIG. 12, wherein the reduced iron chloride solution 17 (a typical example of the iron chloride waste liquid) which is obtained by electrolyzing the etching waste liquid 11 containing iron chloride and the refined iron powder 15 which is produced from the iron powder dust 14 are charged into the mixing vessel 18.

Figure 12:
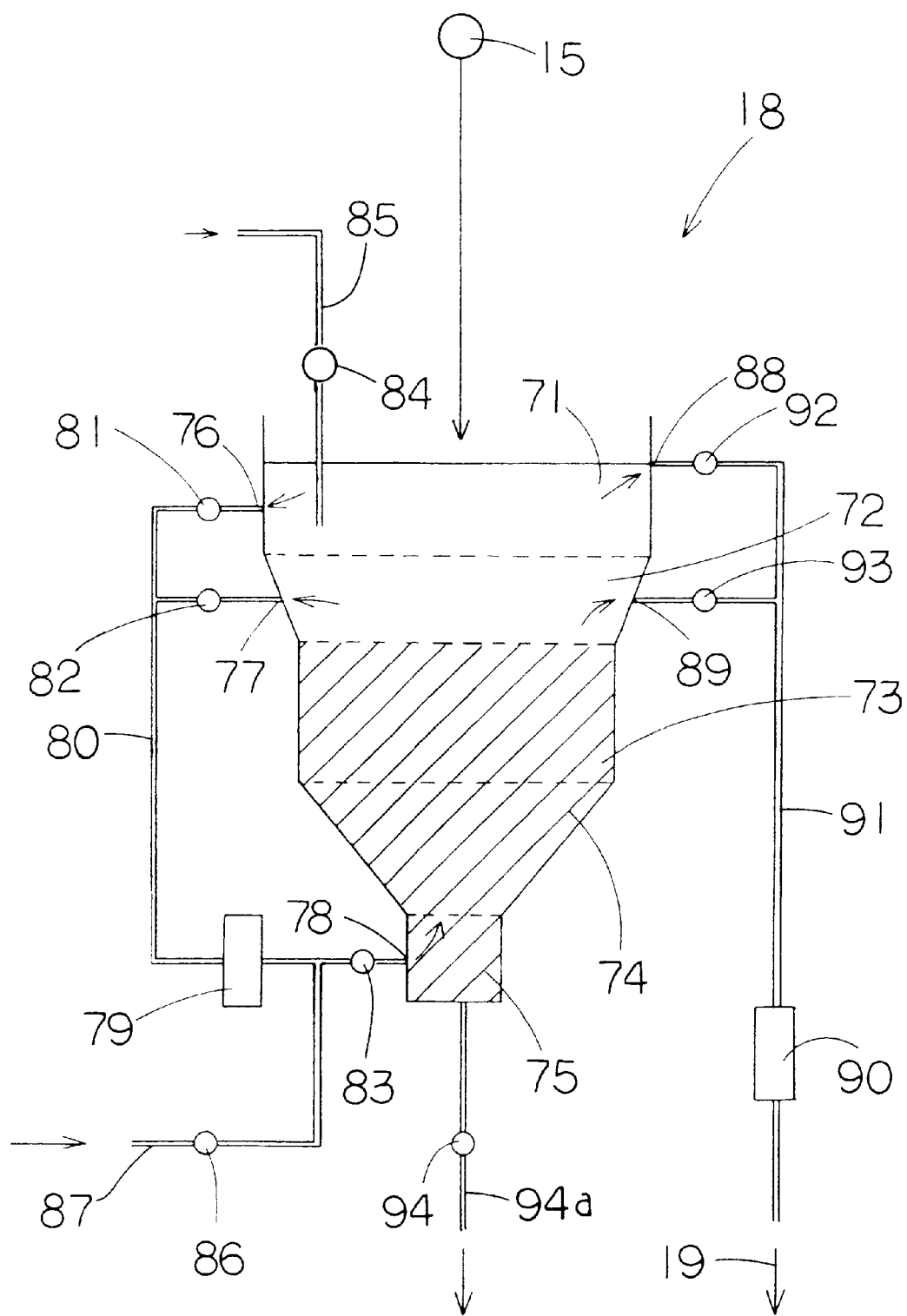
FIG. 12 is an explanatory view showing the mixing vessel of the waste liquid processing facility.

As shown in FIG. 12, the refined iron powder 15 is charged into the mixing vessel 18 through the upper opening of the mixing vessel 18 while the reduced iron chloride solution 17 is fed to the mixing vessel 18 by way of the waste liquid supply valve 86 and the processed liquid return port 78.

The circulating pump 79 is actuated so as to suck and take out a portion of the iron-powder processed liquid 19 which comes up in the upper region of the mixing vessel 18 through the fluidized bed by way of the first and second circulating flow regulating valves 81, 82. Then, iron-powder processed liquid 19 is returned to the mixing vessel 18 through the supply flow regulating valve 83 mounted on the lowermost portion of the mixing vessel 18 so as to form the circulating flow which flows upwardly in the mixing vessel 18. The iron-powder processed liquid 19 is fed to the mixing vessel 18 at an inclined angle so as to cause a whirling flow in the mixing vessel 18.

With such a circulating flow, the fluidized bed can be readily formed wherein the refined iron powder 15 which tends to settle on the bottom of the mixing vessel 18 is dispersed and held in a floating condition in the reduced iron chloride solution 17 thus the refined iron powder 15 and the reduced iron chloride solution 17 are adequately and efficiently mixed with each other without forming any dead space in the mixing vessel 18.

As shown in FIG. 12, since the first and second regions 71, 72 vary in terms of the iron powder distributing condition and the iron powder holding time respectively because of the difference in the planar or transverse cross sectional area, the iron powder concentration of the iron-powder processed liquid 19 discharged from the first region 71 is lower than the iron-powder concentration of the iron-powder processed liquid 19 discharged from the second region 72. Adjusting the take-out amount of the iron-powder processed liquid 19 from respective regions 71, 72 by means of the first and second discharge amount flow regulating valves 92, 93, the properties of the iron-powder processed liquid 19 discharged from the mixing vessel 18 can be controlled.

The solid-liquid ratio of slurry in the fluidized bed formed in the mixing vessel 18 is preferably set at 1:0.6 to 1:0.7. In the fluidized bed, the remaining ferric ion in the reduced iron chloride solution is changed to the ferrous ion by the reaction of the reduced iron chloride solution with the refined iron powder as expressed in following formula and metal ions such as copper ion and nickel ion having the lesser ionization tendency than the iron ion are reduced as expressed in following formula so as to produce the iron-powder processed liquid 19. Incidentally, chromium ion having the lesser ionization tendency than iron ion is also reduced in the same manner by iron powder.

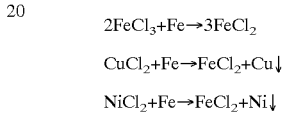

The above-mentioned reducing reaction is influenced by the iron powder concentration in the slurry, the surface area of the iron powder particle, the temperature of the slurry, the chlorine ion concentration and the like. The reducing reaction can be controlled as desired by adjusting these factors or adding pH controlling agents.

In the process for removing the foreign metal ion, the refined iron powder 15 is dissolved in the reduced iron chloride solution 17 so that the ferrous ion is produced. Since the ferric ion is preliminarily removed from the reduced iron chloride solution 17 or the concentration of the ferric iron is decreased by the electrolyzing processing, the dissolving amount of refined iron powder 15 can be minimized. Accordingly, the removal of the foreign metal ion cannot be hampered and the iron-powder processed liquid 19 can be efficiently obtained.

As shown in FIG. 14(c), the concentration of respective foreign metal ions ($M^{n+}$) in the iron-powder processed liquid 19 is considerably decreased compared to the concentration of respective foreign metal ions ($M^{n+}$) in the reduced iron chloride solution 17 produced by the electrolyzing processing (FIG. 14(b)).

The iron powder and other foreign material remaining in the iron-powder processed liquid 19 are removed from the iron-powder processed liquid 19 discharged from the mixing vessel 18 so as to produce the iron-powder processed liquid containing a sufficient amount of the ferrous chloride. This iron-powder processed liquid containing a sufficient amount of the ferrous chloride is fed to the chlorination device 21 where the chlorine gas and the like which are produced at the electrolyzing device 12 is blown into the iron-powder processed liquid to cause a bubbling. As a result, the ferrous ion is partially or entirely oxidized to the ferric ion to produce the etchant 20.

Namely, in the chlorination device 21, the chlorine gas which is produced by the electrolyzing device 12 and works as an oxidizing agent is blown into the iron-powder processed liquid produced to oxidize the ferrous ion remaining in the iron-powder processed liquid. Due to such an oxidizing operation, the reusable etchant 20 which is free from the foreign metal ion and has the concentration of $FeCl_3$ adjusted in a range of 560 to 730 g/l can be obtained as shown in FIG. 14(d).

Along with the production of the etchant 20, the chlorine gas can be produced in the waste liquid processing facility 10 and utilized in the same facility.

As has been described heretofore, in this first embodiment, different from the conventional methods which preliminarily reduces the ferric ion using iron powder, since the ferric ion is reduced by the electrolyzing device 12, the increase of the iron ion in the reducing process can be minimized. Accordingly, in the production of the etchant having a desired ferric ion concentration, the amount of diluting liquid necessary for adjusting the concentration of the ferric ion can be minimized.

Furthermore, since the iron powder used for reducing and removing copper ion and nickel ion can be greatly reduced, a total amount of iron powder used for the entire process of the method of this embodiment can be greatly reduced thus minimizing the cost for iron powder. Still furthermore, since the chlorine gas which is generated at the time of electrolyzing can be collected and utilized in the ensuing chlorinating operation, the cost for the chlorine gas can be also lowered. In addition, since the amount of diluting liquid necessary for recovering the etchant 20 from the etching waste liquid 11 containing iron chloride can be restricted at a low level, the waste liquid processing facility 10 can be made as compact as possible.

(Second Embodiment)

The method for recovering etchant from etching waste liquid containing iron chloride according to the second embodiment of the present invention is hereinafter explained in conjunction with FIG. 16 to FIG. 19.

The method for recovering etchant from etching waste liquid containing iron chloride according to this embodiment is substantially the same as the method for recovering etchant from etching waste liquid containing iron chloride according to the first embodiment shown in FIG. 1 with an exception of following features which will be described later. Accordingly, the detailed explanation of like devices and like parts in the first embodiment are abbreviated.

The method for recovering etchant from etching waste liquid containing iron chloride according to this embodiment is characterized in that the electrolyzing device 12 of the first embodiment is not used while the mixing vessel 18 of the first embodiment is replaced with first and second mixing vessels 115, 119.

Furthermore, although the method for recovering etchant from etching waste liquid containing iron chloride according to this embodiment uses a conventional type of mixing vessel which is provided with a mixing blade in place of the first mixing vessel 115, it is preferable to use the mixing vessel 118 provided with a fluidized bed for the first mixing vessel 115. It may be also possible to use the electrolyzing device 12 in place of the first mixing vessel 115.

Figure 16:
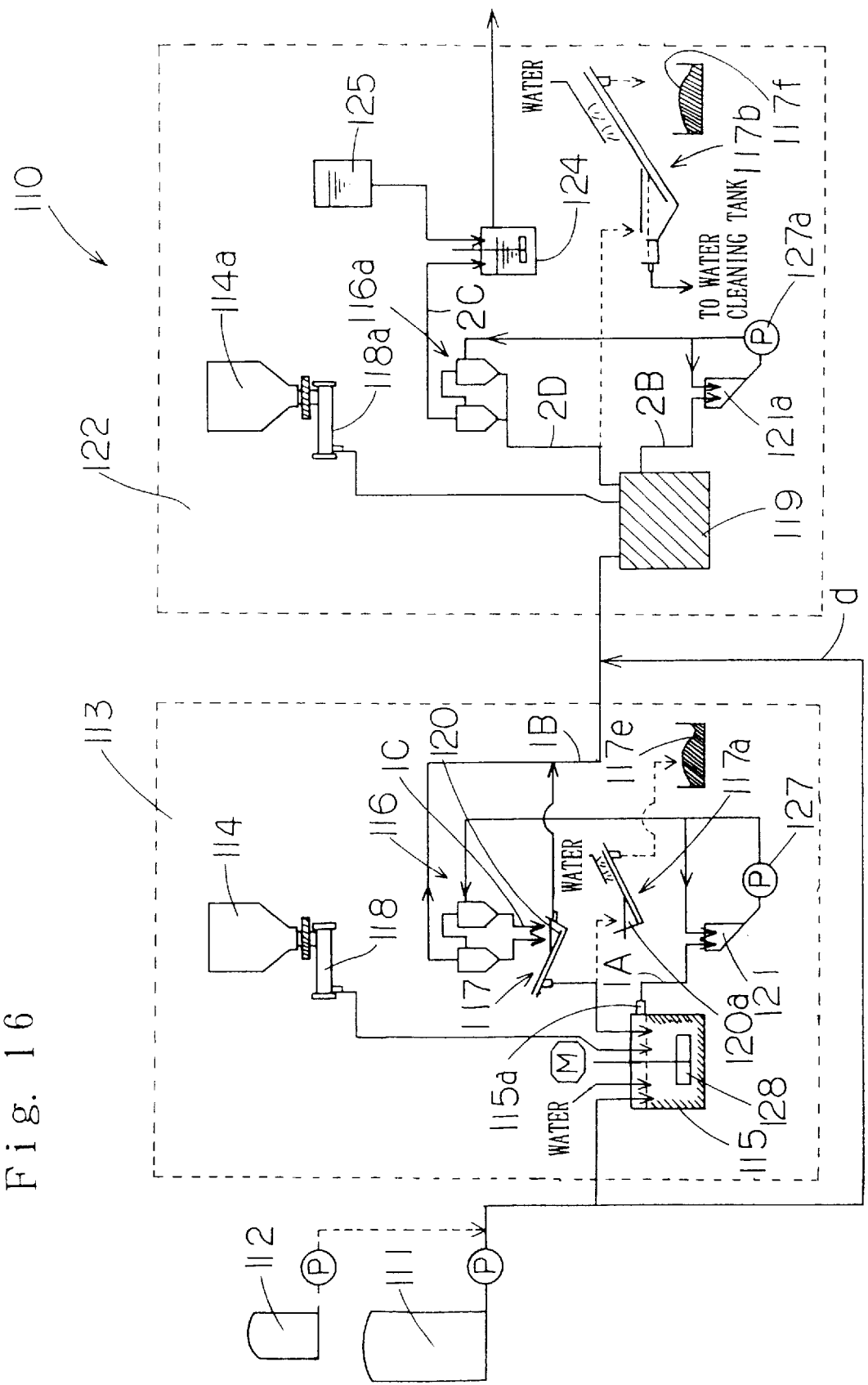
FIG. 16 is a schematic explanatory view showing the waste liquid processing facility used for carrying out the method for recovering etchant from etching waste liquid containing iron chloride according to the second embodiment of the present invention.

As shown in FIG. 16, an etching waste liquid processing facility 110 which is preferably used for the method for recovering etchant from etching waste liquid containing iron chloride according to this embodiment comprises a copper removing device 113 for removing copper from the etching waste liquid, a nickel removing device 122 for removing nickel and chromium from the etching waste liquid from which copper is already removed, and a removal device for removing impurities (not shown in the drawings) such as carbon, silica and the like which are suspended in the etching waste liquid, and a chlorination device 21 (referred to FIG. 1) for producing etchant by oxidizing the processed liquid from which impurities are already removed.

To explain the construction of the copper removing device 113, as shown in FIG. 16, the copper removing device 113 is provided with a first mixing vessel 115 to which the etching waste liquid and the iron powder are respectively supplied from the etching waste liquid storage tank 111 and the iron powder storage tank 114. The water is also supplied to the mixing vessel 115 from a water source such as a water service line (not shown in the drawings). Furthermore, a part of solid material which is collected in the copper removing device 113 is also supplied to the first mixing vessel 115. The iron powder in the iron powder storage tank 114 is fed to the first mixing vessel 115 by means of a screw feeder 118. In the first mixing vessel 115, the etching waste liquid, the iron powder, water and the solid material are mixed together to form iron-powder mixed liquid 1A. A pH controlling agent is supplied to the first mixing vessel 15 from a pH controlling agent storage tank 112.

The first mixing vessel 115 is a circular cylindrical container made of fiber reinforced plastic and is preferably provided with a mixing blade 128 therein for vigorously mixing the iron-powder mixed liquid 1A in a slurry form. The first mixing vessel 115 is also provided with a discharge opening 115a at the upper portion thereof through which the sufficiently mixed iron-powder mixed liquid 1A is discharged from the first mixing vessel 115.

A liquid cyclone separator 116 is provided downstream of the first mixing vessel 115 to receive the iron-powder mixed liquid 1A discharged from the first mixing vessel 115. The iron-powder mixed liquid 1A is fed to the liquid cyclone separator 116 by way of an inversely conical-shaped tank 121 and an iron-powder mixed liquid pump 127. In the liquid cyclone separator 116, the iron-powder mixed liquid 1A is separated into a liquid containing particles of a relatively small particle size (hereinafter called 'copper removed processed liquid 1B') and a liquid containing particles of a relatively large particle size (hereinafter called 'copper containing iron-powder mixed liquid 1C'). A first Akins classifier 117 is provided below the liquid cyclone separator 116 for receiving the copper containing iron-powder mixed liquid 1C discharged from the liquid cyclone separator 116. The copper and iron mixed liquid 1C is classified and washed by the first Akins classifier 117 so as to produce solid material in a powdery form. A part of the solid material in a powdery form is taken out from the first Akins classifier 117 and is transferred to a second Akins classifier 117a in which the part of the solid material is again washed to produce copper powder 117e.

The first and second Akins classifiers 117, 117a are respectively provided with dust sedimentation vessels 120, 120a to which the copper and iron mixed liquid 1A containing the reduced copper is supplied, and solid material lifting pipes (not shown in the drawings) for lifting the solid material in the dust sedimentation vessels 120, 120a for classifying and cleaning the solid material, and cleaning water spraying devices (not shown in the drawings). In operation of these first and second Akins classifiers 117, 117a, minute particles in the solid material are classified first in the dust sedimentation vessels 120, 120a and solid particles which have a relatively large particle size and from which water is removed are discharged from upper ends of respective solid material lifting pipes (not shown in the drawings).

To explain the construction of the nickel removing device 122, as shown in FIG. 16, the nickel removing device 122 is provided with a second mixing vessel 119 to which the copper removed processed liquid 1B which is a typical example of the iron chloride waste liquid is supplied from the liquid cyclone separator 116 of the copper removing device 113 while the iron powder is supplied from the iron powder storage tank 114a by means of a screw feeder 118a. A solid material which is collected by this nickel removing device 122 is also supplied to the second mixing vessel 119. In the second mixing vessel 119, the copper removed processed liquid 1B, the iron powder and the solid material are mixed together to form a primary iron-powder processed liquid 2B which is a typical example of the iron-powder processed liquid in which the nickel ion and the chromium ion and the like are reduced. The second mixing vessel 119 is also provided with a discharge opening 119a through which the sufficiently mixed primary iron-powder processed liquid 2B is discharged from the second mixing vessel 119.

A liquid cyclone separator 116a is provided downstream of the second mixing vessel 119 to receive the primary iron-powder processed liquid 2B discharged from the second mixing vessel 119. The primary iron-powder processed liquid 2B is fed to the liquid cyclone separator 116a by way of an inversely conical-shaped tank 121a and a primary iron-powder processed liquid pump 127a. In the liquid cyclone separator 116a, the primary iron-powder processed liquid 2B is separated into a nickel removed processed liquid 2C containing minute iron powder particles and nickel containing iron-powder processed liquid 2D containing iron powder particles on which nickel is precipitated. An Akins classifier 117b is provided downstream of the liquid cyclone separator 116a for receiving the nickel containing iron-powder processed liquid 2D discharged from the liquid cyclone separator 116a. The nickel containing iron-powder processed liquid 2D is classified and washed by the Akins classifier 117b so as to produce nickel in a powdery form as well as the iron powder to which nickel is adhered. Downstream of the liquid cyclone separator 116a, a mixing adjusting vessel 124 is provided in which a flocculant supplied from a flocculant storage tank 125 is mixed into the nickel removed processed liquid 2C taken out from the liquid cyclone separator 116a.

As shown in a solid line d in FIG. 16. depending on the kind of the iron chloride etching waste liquid, the etching waste liquid which is discharged from the etching waste liquid storage tank 111 may be partially or entirely and directly supplied to the copper removed processed liquid 1B supplied to the second mixing vessel 119.

Figure 17:
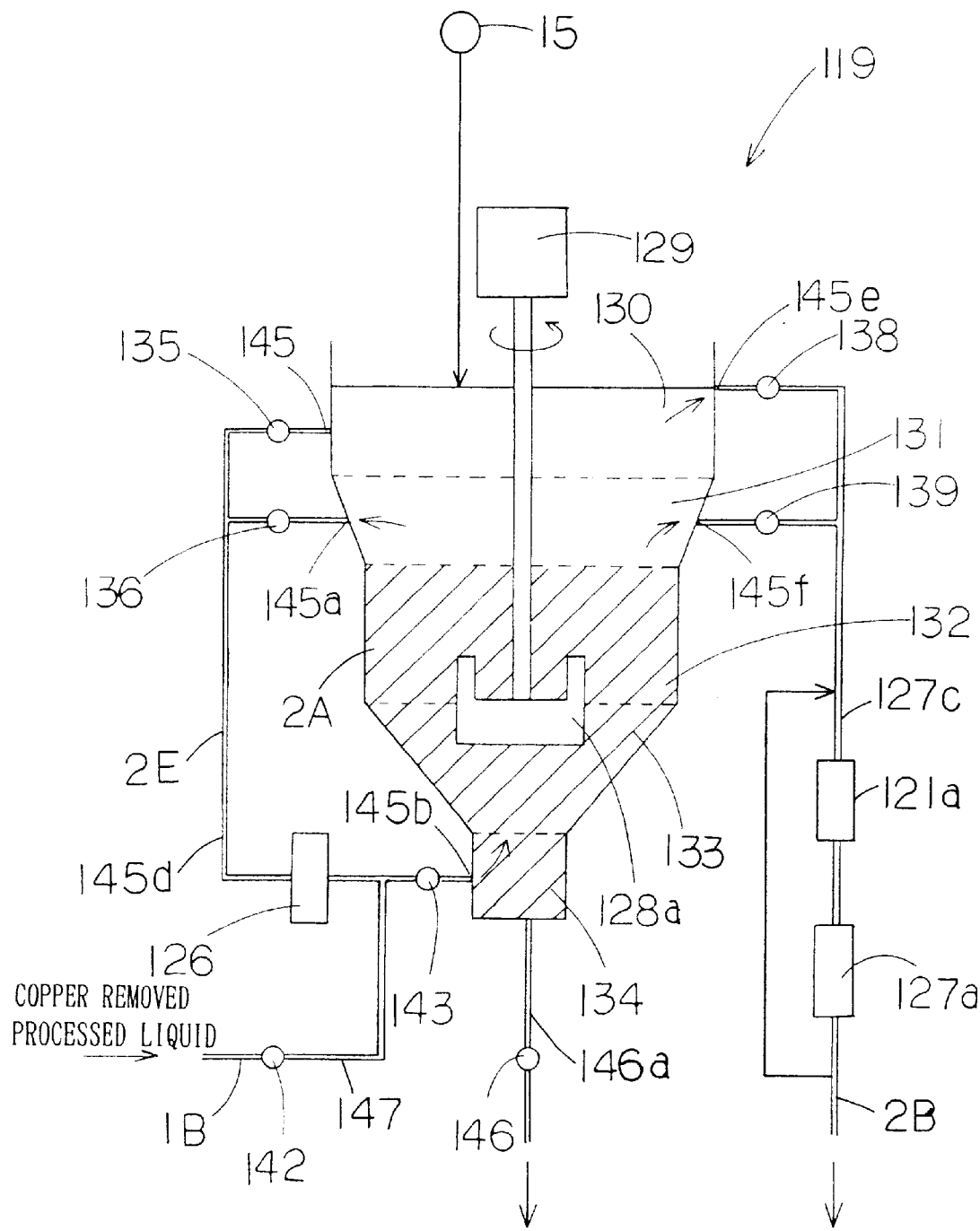
FIG. 17 is a cross-sectional view of the second mixing vessel used in the above-mentioned facility.

To explain the construction of the second mixing vessel 119 more specifically, as shown in FIG. 17, the second mixing vessel 119 defines five regions, namely, the first region 130 to the fifth region 134 therein and these regions 130 to 134 increase their respective planar or transverse cross sectional area in an elevating order from the bottom to the top. To be more specific, the second mixing vessel 119 has a capacity of 17 m³ and the maximum inner diameter is 3.2 m and can contain an approximately 21 tons of the refined iron powder used for the processing of the etching waste liquid.

The second mixing vessel 119 may be provided with a mixing blade 128a at the bottom portion thereof and such a mixing blade 128a is rotated by a power-operated motor 129 disposed above the second mixing vessel 119. In the usual operation, however, the mixing blade 128a is not utilized for mixing of the slurry. Namely, as explained hereinafter, the mixing of the copper removed processed liquid 1B which is a typical example of the iron chloride waste liquid and the iron powder in the second mixing vessel 119 is mainly effected by a circulating flow which is generated by taking out a part of the iron-powder processed liquid 2E from the upper portion of the second mixing vessel 119 and returning such an iron-powder processed liquid 2E to the lower portion of the second mixing vessel 119 by means of the circulating pump 126. Accordingly, with the use of such a mixing blade 128a, the second mixing vessel 119 can process the slurry having a solid-liquid ratio of 1:1 at a speed 1.5 times faster than the conventional mixing vessel provided with the mixing blade driven by the power-operated motor only.

The first region 130 which defines the uppermost portion of the second mixing vessel 119 is a cylindrical region which has the largest planar or transverse cross sectional area. The upper end of the first region 130 opens to the atmosphere so as to enable the charging of the refined iron powder 15 which is produced in the previously mentioned manner in the first embodiment. The second region 131 which is contiguous to the first region 130 is a region which is gradually tapered downwardly.

Below the second region 131, the third region 132 which is made of a cylindrical tube having the same diameter as that of the bottom end of the second region 131 is disposed. The fourth region 133 which is made of a downwardly narrowed taper construction is contiguously connected to the bottom end of the third region 132. The fifth region 134 which is made of a cylindrical tube of a smallest diameter is connected to the bottom end of the fourth region 133. The third to fifth regions 132 to 134 define the fluidized bed which suspends the refined iron powder 15 in high density is formed by the supplied iron powder, the iron-powder processed liquid 2E supplied from the bottom of the mixing vessel 119 and the copper removed processed liquid 1B obtained by processing the etching waste liquid containing iron chloride. The fluidized bed is depicted in hatching in FIG. 17.

In the first and second regions 130, 131, the descending speed of the iron powder is faster than the lifting speed of the processed liquid. Accordingly, an iron-powder separating portion (free board) where the density of iron powder is extremely small can be formed in these regions 130, 131.

Processed liquid partial take-out ports 145, 145a are formed in the side wall portions of the first and second regions 130, 131 which constitute the iron-powder separating portion, while a processed liquid return port 145b is formed in the side wall of the fifth region 134 which defines the lower portion of the fluidized bed. The processed liquid partial take-out ports 145, 145a are connected with a processed liquid circulating pipe 145d and a circulating pump 126 is mounted on the midst portion of the processed liquid circulating pipe 145d. Upon actuation of the circulating pump 126, the iron-powder processed liquid 2E which contains an extremely small amount of iron powder or is completely free from the iron powder is taken out from the first and second regions 130, 131 through the processed liquid partial take-out ports 145, 145a. Subsequently, the iron-powder processed liquid 2E is fed to the fifth region 134 through the processed liquid circulating pipe 145d and the processed liquid return port 145b. In this manner, with the actuation of the circulating pump 126, a circulating flow is defined in the second mixing vessel 119 to form a fluidized bed in the third region 132 to the fifth regions 134.

On the upstream end of the processed liquid circulating pipe 145d, a first and second circulating flow regulating valves 135, 136 are mounted so as to regulate the amount of the iron-powder processed liquid 2E which enters the processed liquid circulating pipe 145d through two processed liquid partial take-out ports 145, 145a, while a supply flow regulating valve 143 is mounted on the downstream end of the circulating pump 126. With the manipulation of these circulating flow regulating valves 135, 136 and the supply flow regulating valve 143, the circulating amount of the iron-powder processed liquid 2E can be readily regulated. Accordingly, irrespective of the amount of the copper removed processed liquid 1B supplied to the second mixing vessel 119 through a copper removed slurry supply pipe 147 provided with a processed liquid supply valve 142, the floating condition of the refined iron powder 15 influenced by the circulating flow in the mixing vessel 119 can be maintained in a desired range so that the fluidized bed can be held in place. In case that the mixing blade 128a is not used, the mixing blade 128a can be removed from the second mixing vessel 119 by means of a mixing-blade removal device mounted on the second mixing vessel 119 although not shown in the drawings.

Furthermore, since the processed liquid return port 145b opens at the side wall of the fifth region 134 where the diameter thereof is smallest and the iron powder tends to be settled, the part of the iron-powder processed liquid 2E fed to the fifth region 134 can effectively whirl the iron powder while preventing the occurrence of the dead spaces in the second mixing vessel 119.

In the side walls of the first and second regions 130, 131, a pair of processed liquid discharge ports 145e, 145f are formed in addition to the above-mentioned processed liquid partial take-out ports 145, 145a. A processed liquid transfer pipe 127c which is provided with the primary iron-powder processed liquid pump 127a in the midst thereof has an upstream end thereof connected to these processed liquid discharge ports 145e, 145f, while the downstream end of the processed liquid transfer pipe 127c is connected with the liquid cyclone separator 116a by way of an inversely conical-shaped tank 121a. A part of the iron-powder processed liquid 2B may be returned to the inversely conical-shaped tank 121a so as to carry out the overall flow regulating operation.

The flow amount of primary iron-powder processed liquid 2B discharged from the processed liquid discharge ports 145e, 145f is regulated by a first and second discharge amount flow regulating valves 138, 139 which are mounted on the bifurcated upstream portions of the processed liquid transfer pipe 127c. In this manner, the primary iron-powder processed liquid 2B is discharged selectively from one of the regions which store the primary iron-powder processed liquids 2B of different properties respectively or a plurality of primary iron-powder processed liquids 2B are discharged from a plurality of regions so that the concentration of ion and the concentration of the iron powder in the primary iron-powder processed liquid 2B can be regulated.

When the refined iron powder 15 in the second mixing vessel 119 lacks, the corresponding amount of the refined iron powder 15 is supplied to the second mixing vessel 119 through the upper opening of the second mixing vessel 119.

Still furthermore, a solid waste discharge pipe 146a is connected to the bottom of the second mixing vessel 119 and a solid waste discharge valve 146 is mounted on the solid discharge pipe 146a. Upon actuation of the solid discharge waste valve 146, the solid waste settled on the bottom of the second mixing vessel 119 is removed from the second mixing vessel 119.

In following Table 3, the processing conditions in the second mixing vessel 119 and the results of the processing are shown along with the processing conditions and the results of the processing of the comparative example using the conventional type of mixing vessel.

TABLE 3

| | | second embodiment | modification of second embodiment | comparative example |
|---|---|---|---|---|
| processing condition | capacity of second mixing vessel m³ | 17 | 17 | 11 mechanical mixing vessel |
| | amount of iron powder held in chamber ton | 21 | 21 | 6 |
| | processing ability (see note) | 1.5 | 1.5 | 1 |
| | mixing blade requirement on particle size of iron powder | equipped small to intermediate size | not equipped small to intermediate size | equipped small size |
| results of processing | maximum flow speed (at periphery) of slurry m/s | 1 | 0.25 | 6 |
| | used amount of pH controlling agent (see note) | 0.3 | 0.3 | 1 |
| | solid-liquid ratio | 1:0.6 to 1:0.7 | 1:1 | 1:3 |
| | wear amount | small | small | large |
| | raw material cost | low | low | high |
| | maintenance cost | low | low | high | note: Processing ability and used amount of pH controlling agent are values on the condition that respective values of the comparative example are set at 1.

The manner in which the method for recovering etchant from etching waste liquid containing iron chloride according to the second embodiment of the present invention using the above-mentioned etching waste liquid processing facility 110 is hereinafter explained in details. In this second embodiment, although the mixing in the first mixing vessel 115 is carried out using a conventional mixing blade, the mixing vessel 18 which forms the fluidized bed for mixing can be used in place of the first mixing vessel 115 so as to provide a method for recovering reusable liquid from the iron chloride waste liquid in a more efficient and economical manner.

As shown in FIG. 16, a desired amount of refined iron powder 15 is preliminarily charged into the first and second mixing vessels 115, 119 from the iron powder storage tank 114, 114a by means of screw feeders 118, 118a. The refined iron powder 15 which can be used for reducing the foreign metal ion preferably has a particle size range of 44 to 250 μm, for example.

The etching waste liquid containing iron chloride processed by the etching waste liquid processing facility 110 of this second embodiment may be a solution which is produced at the time of etching lead frames for IC (Integrated Circuit) or LSI(Large Scale Integrated circuit) or shadow mask of Brown tubes, wherein such a solution contains metal ions such as copper ion, nickel ion and chromium ion in addition to the ferric chloride ($FeCl_3$) of low concentration.

The etching waste liquid containing iron chloride is supplied to the first mixing vessel 115 by means of the pump from the etching waste liquid storage tank 111. The mixing blade 128 is rotated to mix the etching waste liquid containing iron chloride with the refined iron powder 15 so as to produce the mixture slurry.

In this mixture slurry, copper ion which has a lesser ionization tendency than iron ion is reduced and copper powder is precipitated, while the refined iron powder 15 is dissolved in the etching waste liquid as iron ion and is discharged from the first mixing vessel 115 as the iron-powder mixed liquid 1A containing least powder as a result of the iron powder processing. The pH regulating agent such as hydrochloric acid may be added to the mixture slurry 1A, if necessary, so as to adjust the pH of the mixture slurry 1A, for example, in a range of 0.5 to 1.5. With such an adjustment of the pH of the mixture slurry 1A, the speed and the efficiency of above-mentioned reducing reaction can be held in a desired range.

Then, the iron-powder mixed liquid 1A is taken out from a discharge opening 115a formed in the upper part of the first mixing vessel 115 and fed to the inversely conical-shaped tank 121. The iron-powder mixed liquid 1A received in this tank 121 is subsequently fed to the liquid cyclone separator 116 by means of the iron-powder mixed liquid pump 127.

In the liquid cyclone separator 116, the iron-powder mixed liquid 1A is separated into the copper containing iron-powder mixed liquid 1C which contains a considerable amount of iron powder and copper and the copper removed processed liquid 1B from which is almost free from the copper and most iron powder. The copper containing iron-powder mixed liquid 1C discharged from the bottom portion of the liquid cyclone separator 116 is washed and classified in the first and second Akins classifier 117, 117a in sequence and copper powder 117e is obtained as the final product of this processing. It may be possible to collect a part of the slurry processed in the first Akins classifier 117 which contains a considerable amount of iron powder and feed this partial slurry to the first mixing vessel 115.

The copper removed processed liquid 1B discharged from the upper portion of the liquid cyclone separator 116 is supplied to the nickel removing device 122 where metal impurities such as nickel and chromium are removed in a following manner or sequence. As shown in FIG. 16 and FIG. 17, the copper removed processed liquid 1B is supplied to the second mixing vessel 119 by way of a processed liquid supply valve 142, while the refined iron powder 15 is continuously supplied to the second mixing vessel 119 by way of the screw feeder 118a from the iron powder storage tank 114a. Subsequently, the power-operated motor 129 is driven to rotate the mixing blade 128a at a desired rotating speed, for example at a low speed of 5 to 60 rpm. However, in case that the mixing in the second mixing vessel 119 is carried out by the mixing blade 128a, since the specific gravity of the refined iron powder 15 in the copper removed processed liquid 1B is far higher than the specific gravity of the copper removed processed liquid 1B, the refined iron powder 15 cannot be sufficiently uniformly dispersed in the copper removed processed liquid 1B so that the refined iron powder 15 are settled and accumulated on the bottom of the second mixing vessel 119. Furthermore, dead spaces are formed in the mixing vessel 119 so that the efficiency of reaction between the iron powder and the copper removed processed liquid 1B cannot be maintained above the predetermined level. Accordingly, the sufficient mixing between the copper removed processed liquid 1B and the refined iron powder 15 cannot be achieved. It may be possible to increase the power of the power-operated motor 129 so as to rotate the mixing blade 128a at a high speed and provide a sufficient mixing of the copper removed processed liquid 1B and the refined iron powder 15. However, the power consumption of the power-operated motor 129 becomes excessively large and the mixing vessel 119 which is made of fiber reinforced plastic suffers from the severe wear thus increasing the cost for maintenance such as the replacement of the mixing vessel. The mixing blade 128a also suffers from the severe wear.

Accordingly, in this embodiment, without using the mixing blade 128a or removing the mixing blade 128a if necessary, the circulating pump 126 is driven to partially take out the iron-powder processed liquid 2E containing a small amount or least amount of iron powder from the upper portion of the second mixing vessel 119 by way of the first and second circulating flow regulating valves 135, 136, and return the iron-powder processed liquid 2E to the lower portion of the second mixing vessel 119 by way of the supply flow regulating valve 143 formed in the lowermost portion of the second mixing vessel 119 to cause a whirling or spiral flow in the second mixing vessel 119 which has a desired spiraling angle. In this manner, the circulating flow which moves in an upward direction can be formed in the second mixing vessel 119. Due to this circulating flow, there is no dead space in the second mixing vessel 119 and the refined iron powder 15 which tends to be settled on the bottom of the second mixing vessel 119 can be uniformly dispersed and floated in the copper removed processed liquid 1B. Namely, even if the power of the power-operated motor 129 for driving the circulating pump 126 is small, the refined iron powder 15 and the copper removed processed liquid 1B can be efficiently mixed with each other.

As shown in FIG. 17, since the first region 130 which has a cylindrical construction and the second region 131 which has a tapered construction vary in terms of the iron powder distributing condition and the iron powder holding time respectively because of the difference in the planar or transverse cross sectional area, the iron powder concentration of the primary iron-powder processed liquid 2B discharged from the first region 130 is lower than the iron powder concentration of the primary iron-powder processed liquid 2B discharged from the second region 131. Adjusting the take-out amount of primary iron-powder processed liquid 2B from respective regions 130, 131 by means of the first and second discharge amount flow regulating valves 138, 139, the properties of the iron-powder processed liquid 2B taken out from the second mixing vessel 119 and fed to the inversely conical-shaped tank 121a can be controlled. In this manner, due to a coupled effect by the desired circulating flow formed in the second mixing vessel 119 and the low-speed rotation of the mixing blade 128a in the second mixing vessel 119, the maximum flow speed of the primary iron-powder processed liquid 2B at the periphery of the second mixing vessel 119 can be held at 1 m/s. Accordingly, a whirling flow is generated in the second mixing vessel 119 along with the lifting flow so that the mixing efficiency is enhanced. It must be noted that a high-speed rotation or an intermediate-speed rotation of the mixing blade 128b causes a severe wear the second mixing vessel 119 and of the mixing blade 128a.

In the second mixing vessel 119, following reducing process is carried out to form the primary iron-powder processed liquid 2B, where nickel ion and chromium ion are reduced by the iron powder.

$$2FeCl_3 + Fe \rightarrow 3FeCl_2$$

$$NiCl_2 + Fe \rightarrow FeCl_2 + Ni\downarrow$$

This reducing reaction is influenced by the iron powder concentration in the slurry 2A, the surface area of the iron powder particle, the temperature of the slurry 2A, the chlorine ion concentration and the like. The reducing reaction can be controlled as desired by adjusting these factors or adding pH controlling agents. The solid-liquid ratio of the copper reduced slurry 2A in the second mixing vessel 119 is preferably set at 1:0.6 to 1:0.7 as shown in Table 3.

The primary iron-powder processed liquid 2B which is obtained in this manner is fed to the inversely conical-shaped tank 121a and is subsequently supplied to the liquid cyclone separator 116a by means of the primary iron-powder processed liquid pump 127a. In the liquid cyclone separator 116a the primary iron-powder processed liquid 2B is separated into the nickel removed processed liquid 2C and the nickel containing iron-powder processed liquid 2D. A part of the nickel containing iron-powder processed liquid 2D discharged from the bottom portion of the liquid cyclone separator 116a is returned to the second mixing vessel 119 while the remaining major portion of the nickel containing iron-powder processed liquid 2D is fed to the Akins classifier 117b where nickel and iron powder 117f to which nickel is adhered is collected. The nickel removed processed liquid 2C discharged from the upper portion of the liquid cyclone separator 116a is fed to the mixing adjusting vessel 124 where the flocculant supplied from the flocculant storage tank 125 is added. Subsequently, the nickel removed processed liquid 2C is fed to the succeeding device for removing suspended impurities from the nickel removed processed liquid 2C.

In this impurities removing device, the nickel removed processed liquid 2C which contains suspended impurities such as carbon and silica is processed in a solid-liquid separator such as a decanter in such a manner that the nickel removed processed liquid 2C is separated into the suspended impurities and a secondary iron-powder processed liquid 2F (corresponding to the iron-power processed liquid 19 in the first embodiment) and this secondary iron-powder processed liquid 2F is further processed to become a final product which can be used as a raw material for etchant 20 by a chlorination.

The comparative example shown in Table 3 is a case in which the reducing processing is carried out by a mechanical mixing vessel which is provided with a mixing blade but is not provided with a circulating flow. The mechanical mixing vessel is a reactor which has a capacity of 11 $m^3$ and contains 6 tons of the iron powder therein. Compared to this comparative example where the slurry is flown at a maximum speed of 6 m/s, in the second embodiment, the maximum flow speed of the slurry in the mixing vessel can be lowered from 6 m/s to 1 m/s so that the solid-liquid ratio can be increased from the conventional 1:3 to 1 to (0.6 ~0.7). In this manner, the reducing processing can be enhanced while the wear on the second mixing vessel 119 can be minimized thus enabling the reduction of the maintenance cost. Furthermore since the iron powder having a large particle size which is relatively easily accessible can be used in the processing, the cost of material can be lowered as well.

A third mixing vessel 150 which is a modification of the second mixing vessel 119 and can be used in place of the second mixing vessel 119 in the method for recovering etchant from the etching waste liquid containing iron chloride of the second embodiment of the present invention is explained hereinafter.

Figure 18:
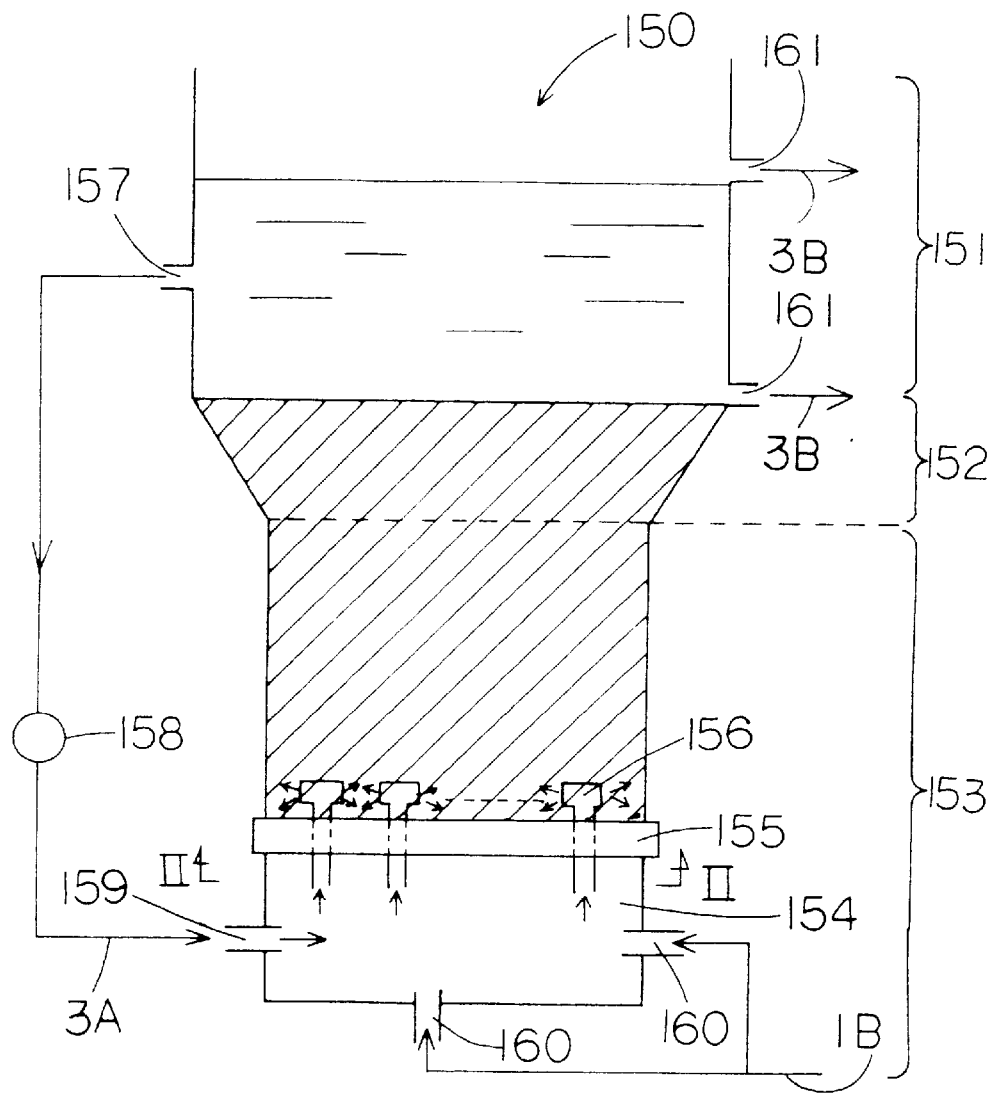
FIG. 18 is a side cross-sectional elevation view of the third mixing vessel which is a modification of the second mixing vessel.
Figure 19:
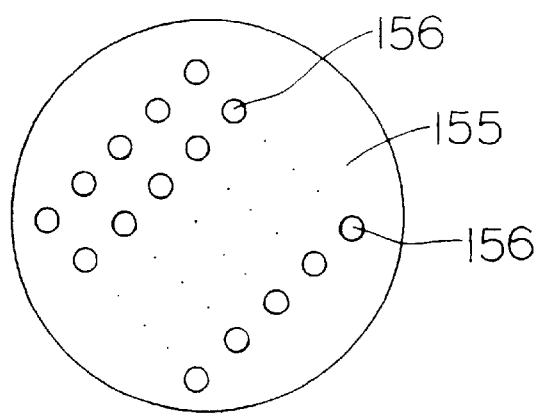
FIG. 19 is a cross-sectional view of the third mixing vessel taken along line II—II of FIG. 18.

As shown in FIG. 18 and FIG. 19, the third mixing vessel 150 defines three regions, namely, the first region 151 to the third region 153 therein and these regions 151 to 153 increase their respective planar or transverse cross sectional areas in an elevating order from the bottom to the top. The third mixing vessel 150 preliminarily stores a predetermined amount of the iron powder or the refined iron powder 15 which is produced by the above-mentioned iron-powder refining apparatus 16. As the iron powder or the refined iron powder 15 is consumed during the reducing processing in the third mixing vessel 150, the fresh iron powder or refined iron powder 15 is continuously fed or supplied to the third mixing vessel 150 to cover the consumed iron powder or the consumed reduced iron powder from an iron powder supply device not shown in the drawings.

At the bottom portion of the third mixing vessel 150, a separation plate 155 is provided so as to define a fluidized bed on the separation plate 155 in the third region 153 and a fluid body supply portion 154 below the separation plate 155. The fluidized bed is made of the upper part of the third region 153 and the whole second portion 152. A multiplicity of T-shaped nozzles 156 are mounted on the upper surface of the separation plate 155 in a staggered pattern or in a grid array so as to blow off the processed liquid supplied from the fluid body supply portion 154 in a horizontal direction. A liquid take-out port 157 is formed in the side wall of the first region 151 for taking out a desired amount of iron-powder processed liquid 3A necessary to form the fluidized bed in the third mixing vessel 150. The first region 151 forms an iron-powder separating portion.

The iron-powder processed liquid 3A then is returned to the fluid body supply portion 154 of the third mixing vessel 150 by way of a circulating pump 158 and a fluid body supply inlet 159 formed in the fluid body supply portion 154 so as to form a circulating flow in the third mixing vessel 150. Due to this circulating flow, the iron powder is given an energy to move in an upward direction and is uniformly dispersed in the fluid body.

A supply inlet 160 for supplying the copper removed processed liquid obtained from the first mixing vessel 115 and the affiliated facilities is mounted on the bottom and/or the side wall of the fluid supply portion 154, while a discharge outlet 161 for discharging an iron-powder processed liquid 3B (corresponding to the iron-powder processed liquid 19 in the first embodiment) is mounted on the first region 151 which forms the upper portion of the third mixing vessel 150.

Using the third mixing vessel 150 having the above-mentioned construction, upon actuation of the circulating pump 158, the processed liquid is fed to the fluidized bed through the nozzle 156 and the iron powder is held in a floating and suspended condition in the fluidized bed.

In this modification, compared to the mixing vessel of the comparative example which carries out the mixing of the iron powder and the processed liquid by mixing blade under conditions shown in Table 3, the maximum flow speed of slurry can be lowered to 0.25 m/s from 6 m/s so that the solid-liquid ratio can be increased from 1:3 to 1:1.

Furthermore, as shown in the item 'requirement on particle size of iron powder' of Table 3, in this embodiment and the modification thereof, due to the circulating flow formed from the processed liquid in the second mixing vessel 119, the mixing conditions can be controlled readily so that the refined iron powder having particle size in a wide range can be utilized in the reduction process, whereas, in the comparative example, the refined iron powder which can be used for the reduction process can use only the iron powder having a small particle size so that the material cost is increased.

Industrial Applicability

In the method for recovering etchant from etching waste liquid containing iron chloride of the present invention, the iron chloride waste solution is supplied to the mixing vessel and a part of the iron-powder processed liquid is continuously taken out from an upper portion of the mixing vessel and is returned to a bottom portion of mixing vessel so as to form a circulating flow and a fluidized bed in the mixing vessel which holds the iron powder in the fluidized bed in a dispersed and floating state, and an excessive amount of the iron-powder processed liquid is taken out from the mixing vessel. Accordingly, the method for recovering etchant from etching waste liquid containing iron chloride of the present invention has following advantages ① to ④.

① The amount of a fluid body which is necessary to hold the condition of the fluidized bed in a desired range is covered by the amount of the iron-powder processed liquid lifting up through the fluidized bed. Accordingly, in case that the feeding speed of the iron chloride waste solution becomes lower than the desired speed range, the fluidized bed is held in a stable condition by increasing the amount of the circulating flow, while in case that the feeding speed of the iron chloride waste solution exceeds the desired speed range, the fluidized bed is also held in a stable condition by decreasing the amount of the circulating flow. In this manner, the stable reducing processing of the iron chloride waste solution can be carried out constantly.

② By arranging discharge ports for the iron-powder processed liquid at desired positions in the mixing vessel, it is possible to eliminate the dead spaces in the mixing vessel so that foreign metal ion in the mixing vessel can be removed efficiently from the iron chloride waste solution with the minimum facility.

③ Since the movement of iron powder in the fluidized bed becomes uniform, the mixing vessel suffers from least amount of wear compared to a conventional mechanical mixing vessel which exclusively uses a mixing blade for a mixing operation. Thus, the lifetime of the mixing vessel is prolonged and the maintenance cost is reduced.

④ The favorable mixture made of the iron powder and the iron chloride waste solution can be realized in the fluidized bed having a relatively narrow space so that the mixing vessel as a whole can be made compact.

Particularly, in case that the iron chloride waste solution is fed to the mixing vessel through the bottom portion of the mixing vessel, mixing of the iron chloride waste solution which is fed to the mixing vessel with iron-powder processed liquid can be prevented and the fluidized bed can be readily formed in the mixing vessel.

Furthermore, according to the method for recovering etchant from etching waste liquid containing iron chloride, the upper portion of the mixing vessel has the larger planar or transverse cross sectional area than the main portion of the mixing vessel so that the lifting speed of the fluid body in the mixing vessel can be lowered thus preventing the lifting up of the iron powder and confining the iron powder in the fluidized bed. Since the iron powder separating portion is defined in the upper portion of the mixing vessel, even when the amount of total fluid in the mixing vessel varies or fluctuates, the upper end of the fluidized bed can be held within a predetermined range of level so that the infiltration of the iron powder into the iron-powder processed liquid can be effectively prevented. Accordingly, the foreign metal ion can be removed in a stable condition thus enhancing the removal of the foreign metal ions.

Still furthermore, according to the method for recovering etchant from etching waste liquid containing iron chloride, the iron chloride waste solution supplied to the mixing vessel is preliminarily subjected to the electrolyzing processing so that a part of or the whole ferric ion present in the original liquid is reduced to the ferrous ion. Due to such an electrolyzing processing, the ferric ion is reduced making use of a cathode reaction so that total concentration of iron ion consisting of the ferric ion and the ferrous ion is not changed. Accordingly, in processing the iron chloride waste solution, it is unnecessary to add a considerable amount of diluting liquid such as water to the iron chloride waste solution to set the concentration of the ferric ion at a predetermined value. Therefore, the cost which becomes necessary for processing of an excess etchant is minimized and the facility can be made compact. Since the amount of iron powder used for producing the iron chloride waste solution can be reduced, the processing cost of the iron chloride waste solution can be reduced.

Still furthermore, according to the method for recovering etchant from etching waste liquid containing iron chloride, the electrolytic voltage used in the electrolyzing processing of the etching waste liquid containing iron chloride is controlled in a predetermined range so that the precipitation of the foreign metal such as copper and nickel contained in the etching waste liquid containing iron powder can be prevented. Accordingly, the ferric ion can be reduced smoothly thus facilitating the processing of the iron chloride waste solution.

Still furthermore, according to the method for recovering etchant from etching waste liquid containing iron chloride, the distance between the anode and cathode in the electrolyzing vessel is set at a predetermined range such that the infiltration of the chlorine gas produced on the anode into the cathode chamber can be restricted so that oxidation of the ferrous ion is restricted and the application of high electrolyzing voltage can be obviated.

Still furthermore, according to the method for recovering etchant from etching waste liquid containing iron chloride, the electrolyzing vessel is partitioned to the anode chamber and the cathode chamber by means of the membrane and the iron chloride waste solution is charged into the cathode chamber and the reduced iron chloride solution is discharged from the cathode chamber by way of the processing liquid take-out pipe mounted in the cathode chamber. Accordingly, the infiltration of the chlorine gas produced on the anode into the etching waste liquid containing iron chloride fed to the electrolyzing vessel can be prevented assuring an efficient electrolyzing operation.

Still furthermore, according to the method for recovering etchant from etching waste liquid containing iron chloride, the concentration of the ferric ion in the reduced iron chloride solution is set at 10 to 120 g/l so that the reducing of the foreign metal ion such as copper ion and nickel ion in the iron chloride solution can be prevented. Accordingly, an ensuing processing can be carried out smoothly thus lowering the cost necessary for such a processing.

Still furthermore, according to the method for recovering etchant from etching waste liquid containing iron chloride, the chlorine gas produced at the time of electrolyzing processing is blown into the iron-powder processed liquid discharged from the mixing vessel so as to oxidize the part of the ferrous ion into the ferric ion. Due to such a processing, the chlorine gas which is produced as a byproduct can be effectively utilized and the concentration of the ferric ion in the iron-powder processed liquid which is free from foreign metal ions is adjusted in a desired range so that the recovered liquid which has desired composition and concentration can be efficiently obtained.

Still furthermore, according to the method for recovering etchant from etching waste liquid containing iron chloride, the iron powder charged into the mixing vessel is the refined iron powder which is produced in such a manner that the iron powder dust is collected from the dust which is produced at the steel refining furnace and contains impurities such as CaO and the like by a wet-type collecting method, and then the collected iron powder dust is crushed and washed with water, and finally is washed with acid. With such a processing, the refined iron powder which has least particle size deviation and high purity can be used to recover the etchant from the etching waste liquid containing iron chloride in an inexpensive manner.

Still furthermore, according to the method for recovering etchant from etching waste liquid containing iron chloride, the screw conveyor which is provided with the acid spray outlet is disposed in the sedimentation vessel in an inclined manner and the washing of the iron powder dust by acid is gradually proceeded in the screw conveyor. Due to such a provision, the iron powder which is used for the reduction processing of the iron chloride waste solution can be produced cheaply on a mass production basis by the continuous running of the screw conveyor.

We claim:

1. Method for recovering etchant from etching waste liquid containing iron chloride, the method comprising mixing iron powder with iron chloride waste solution containing metal ions having lesser ionization tendency than iron ion in a mixing vessel so as to cause a reaction between the iron powder and the metal ions and precipitate metals, removing precipitated metals from iron chloride waste solution to produce iron-powder processed liquid, and oxidizing the iron-powder processed liquid, wherein the iron chloride waste solution is supplied to the mixing vessel and a part of the iron-powder processed liquid is taken out from an upper portion of the mixing vessel and is returned to a bottom portion of the mixing vessel so as to form a fluidized bed in said mixing vessel which holds the iron powder in the fluidized bed in a dispersed and floating state, and an excess amount of the iron-powder processed liquid is taken out from the upper portion of the mixing vessel.

2. Method for recovering etchant from etching waste liquid containing iron chloride according to claim 1, wherein the iron chloride waste solution is supplied to the mixing vessel from the bottom portion of the mixing vessel to facilitate the formation of the fluidized bed.

3. Method for recovering etchant from etching waste liquid containing iron chloride according to claim 1, wherein an iron powder separating portion is formed at the upper portion of the mixing vessel which has a transverse cross sectional area greater than that of a fluidized bed forming portion at the bottom portion of the mixing vessel where the fluidized bed is formed, wherein the speed of the lifting flow in the mixing vessel is decelerated so that the lifting of the iron powder dispersed and floating bed is restricted.

4. Method for recovering etchant from etching waste liquid containing iron chloride according to claim 1, further including subjecting an etching waste liquid containing iron chloride to an electrolyzing processing such that a part of or whole ferric ion in the etching waste liquid is reduced to the ferrous ion to produce a reduced iron chloride solution which is used as the iron chloride waste solution supplied to and processed in the mixing vessel.

5. Method for recovering etchant from etching waste liquid containing iron chloride according to claim 4, wherein, during the electrolyzing processing, an electrolytic voltage is controlled in a range of 1 to 4.5 V and a current density is controlled in a range of 2 to 40 A/dm$^2$.

6. Method for recovering etchant from etching waste liquid containing iron chloride according to claim 4, wherein the distance between an anode and a cathode in the electrolyzing vessel is set to 1.5 to 50 mm.

7. Method for recovering etchant from etching waste liquid containing iron chloride according to claim 4, wherein the electrolyzing vessel is constructed such that the vessel is partitioned by a liquid permeable membrane to define an anode chamber provided with the anode plate and a cathode chamber provided with the cathode plate and the etching waste liquid containing iron chloride is supplied to the cathode chamber through one part of the cathode chamber and the reduced iron chloride solution which is produced as the result of reducing processing in the cathode chamber is taken out from another part of the cathode chamber.

8. Method for recovering etchant from etching waste liquid containing iron chloride according to claim 4, wherein the concentration of ferric ion remaining in the reduced iron chloride solution produced as the result of the electrolytic process is in a range of 10 to 120 g/l.

9. Method for recovering etchant from etching waste liquid containing iron chloride according to claim 4, wherein a portion of or the whole chlorine gas generated from the anode is blown into the iron-powder processed liquid taken out from the mixing vessel to oxidize the ferrous ion into the ferric ion.

10. Method for recovering etchant from etching waste liquid containing iron chloride according to claim 1, wherein the iron powder is iron powder dust produced at a steel refining furnace and contains impurities by means of a wet dust collecting method and the iron powder dust is crushed and washed with water to remove the impurities and finally is subjected to an acid cleaning to produce refined iron powder.

11. Method for recovering etchant from etching waste liquid containing iron chloride according to claim 10, wherein said acid cleaning is conducted in a screw conveyor provided with an acid spray outlet at the upper portion thereof and disposed in a slanted position in a sedimentation vessel, the iron powder dust being charged in and settled on the bottom of the sedimentation vessel, and acid being sprayed onto the iron powder dust gradually discharged from the sedimentation vessel with the actuation of the screw conveyor.

12. A method for recovering etchant from etching waste liquid containing iron chloride according to claim 10, wherein the impurities contained in the iron powder dust include CaO.

* * * * *